US012566695B2

(12) United States Patent
Song

(10) Patent No.: US 12,566,695 B2
(45) Date of Patent: Mar. 3, 2026

(54) MEMORY CONTROLLER FOR MANAGING BAD BLOCK, METHOD OF OPERATING MEMORY CONTROLLER, AND STORAGE DEVICE

(71) Applicant: SK hynix Inc., Icheon-si (KR)

(72) Inventor: Bu Yong Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 56 days.

(21) Appl. No.: 18/518,702

(22) Filed: Nov. 24, 2023

(65) Prior Publication Data

US 2025/0004938 A1     Jan. 2, 2025

(30) Foreign Application Priority Data

Jun. 28, 2023    (KR) ......................... 10-2023-0083482

(51) Int. Cl.
*G06F 12/02*          (2006.01)

(52) U.S. Cl.
CPC ................................ *G06F 12/0246* (2013.01)

(58) Field of Classification Search
CPC .. G06F 12/0246; G06F 3/0604; G06F 3/0614; G06F 3/064; G06F 3/0658; G06F 3/0659; G06F 2212/1016; G06F 2212/1032
See application file for complete search history.

(56) References Cited

U.S. PATENT DOCUMENTS

| | | | | |
|---|---|---|---|---|
| 2010/0205356 A1* | 8/2010 | Mukaida | ............. | G06F 12/0246 |
| | | | | 711/E12.078 |
| 2018/0366210 A1* | 12/2018 | Park | ..................... | G11C 29/886 |
| 2019/0188101 A1* | 6/2019 | Kim | ..................... | G06F 11/2094 |
| 2020/0110545 A1* | 4/2020 | Choi | ..................... | G06F 3/0679 |
| 2020/0192796 A1* | 6/2020 | Lee | ..................... | G06F 12/0646 |
| 2021/0042201 A1* | 2/2021 | Byun | ................. | G06F 11/2094 |
| 2021/0333999 A1* | 10/2021 | Park | ........................ | G06F 3/064 |

FOREIGN PATENT DOCUMENTS

| | | |
|---|---|---|
| KR | 10-2019-0110243 A | 9/2019 |
| KR | 10-2020-0038812 A | 4/2020 |
| KR | 10-2021-0017481 A | 2/2021 |
| KR | 10-2021-0080907 A | 7/2021 |

* cited by examiner

*Primary Examiner* — Tasnima Matin
(74) *Attorney, Agent, or Firm* — James Y Kim

(57) ABSTRACT

A storage device includes a memory device including a plurality of planes each including a plurality of memory blocks, and a controller configured to group the memory blocks into a plurality of super blocks, each including memory blocks belonging to two or more planes operating in parallel, change mapping information so that a bad block included in a super block to be allocated during super block allocation is replaced with a replacement block of the same plane as the bad block, and delete the mapping information corresponding to the replacement block when an allocated super block is released. The memory blocks are divided into user memory blocks grouped into the super blocks and reserved memory blocks that are not grouped into the super blocks, and the replacement block is selected from memory blocks included in free super blocks of an empty status and the reserved memory blocks.

19 Claims, 20 Drawing Sheets

DIE

| | Plane 0 | Plane 1 | Plane 2 | Plane 3 | |
|---|---|---|---|---|---|
| | Block 0 | Block 1 | Block 2 | Block 3 | |
| | Block 4 | Block 5 | Block 6 | Block 7 | SB 1 |
| | Block 8 | Block 9 | Block 10 | Block 11 | |
| | Block 12 | Block 13 | Block 14 | Block 15 | |
| | Block 16 | Block 17 | Block 18 | Block 19 | |
| 111 | Block 20 | Block 21 | Block 22 | Block 23 | |
| | Block 24 | Block 25 | Block 26 | Block 27 | |
| | . . . | . . . | . . . | . . . | |
| | Block 388 | Block 389 | Block 390 | Block 391 | |
| | Block 392 | Block 393 | Block 394 | Block 395 | |
| | Block 396 | Block 397 | Block 398 | Block 399 | |
| | Block N | Block N+1 | Block N+2 | Block N+3 | |
| 112 | Block N+4 | Block N+5 | Block N+6 | Block N+7 | |
| | Block N+8 | Block N+9 | Block N+10 | Block N+11 | |

| | Status | |
|---|---|---|
| SB 0 | Allocated | Full |
| SB 1 | Allocated | Full |
| SB 2 | Allocated | Open |
| SB 3 | Unallocated | Free |
| SB 4 | Unallocated | Free |
| . . . | . . . | . . . |
| SB 97 | Allocated | Open |
| SB 98 | Allocated | Full |
| SB 99 | Unallocated | Free |

| Block | |
|---|---|
| MBB | Block 5 |
| | Block 9 |
| | Block 389 |
| GBB | Block 393 |

FIG. 16

|  | Blocks | | | | Status | Replacement | Erase Count |
|---|---|---|---|---|---|---|---|
|  | Plane 0 | Plane 1 | Plane 2 | Plane 3 | | | |
| SB 0 | Block 0 | Block 1 | Block 2 | Block3 | Allocated (Full) | | |
| SB 1 | Block 4 | ~~Block 5~~ Block N+1 | Block 6 | Block 7 | Allocated (Full) | | |
| SB 2 | Block 8 | ~~Block 9~~ Block N+5 | Block 10 | Block 11 | Allocated (Open) | | |
| SB 3 | Block 12 | Block 13 | Block 14 | Block 15 | Free | X | 5 |
| SB 4 | Block 16 | Block 17 | Block 18 | Block 19 | Free | X | 10 |
| . . . | . . . | . . . | . . . | . . . | . . . | . . . | . . . |
| SB 97 | Block 388 | ~~Block 389~~ Block N+9 | Block 390 | Block 391 | Allocated (Open) | | |
| SB 98 | Block 392 | ~~Block 393~~ Block 397 | Block 394 | Block 395 | Allocated (Full) | | |
| SB 99 | Block 396 | Block 397 | Block 398 | Block 399 | Free | 0 | 1 |
| RB | Block N | Block N+1 | Block N+2 | Block N+3 | – | – | – |
|  | Block N+4 | Block N+5 | Block N+6 | Block N+7 | – | – | – |
|  | Block N+8 | Block N+9 | Block N+10 | Block N+11 | – | – | – |

MEMORY CONTROLLER FOR MANAGING BAD BLOCK, METHOD OF OPERATING MEMORY CONTROLLER, AND STORAGE DEVICE

CROSS-REFERENCE TO RELATED APPLICATION

The present application claims priority under 35 U.S.C. § 119(a) to Korean patent application number 10-2023-0083482 filed on Jun. 28, 2023, in the Korean Intellectual Property Office, the entire disclosure of which is incorporated by reference herein.

BACKGROUND

1. Field of Invention

The present disclosure relates to a memory controller, a method of operating the memory controller, and a storage device.

2. Description of Related Art

A flash memory is a non-volatile memory device that may maintain stored data even though power to the device is cut off. Recently, storage devices including a flash memory have been widely used, such as a solid state drive (SSD) and a memory card. Some non-volatile memory devices may have manufacturing defects or may have a defect that grows over time due to various causes. As a result, some of dies included in a non-volatile memory may be determined as fail dies or failure dies. Here, a fail die may refer to a die in which block replacement may not be performed with a reserved block from the same die because the number of bad blocks generated in the die exceeds a reference number.

Because the number of reserved blocks capable of performing block replacement is limited, the yield and performance of a memory device may be limited, and so a new method for solving this issue is required.

SUMMARY

Embodiments of the present disclosure provide a memory controller, a method of operating the memory controller, and a storage device capable of improving yield and performance of a memory device.

According to an embodiment of the present disclosure, a storage device may include a memory device including a plurality of planes each including a plurality of memory blocks, and a controller configured to group the memory blocks into a plurality of super blocks, each super block including memory blocks belonging to two or more planes operating in parallel, to change mapping information so that a bad block included in the super block to be allocated during super block allocation is replaced with a replacement block of the same plane as the bad block, and to delete the mapping information corresponding to the replacement block when an allocated super block is released. The plurality of memory blocks may be divided into user memory blocks grouped into the super blocks and reserved memory blocks that are not grouped into the super blocks, and the replacement block may be selected from a group consisting of memory blocks included in free super blocks with an empty status and the reserved memory blocks.

According to an embodiment of the present disclosure, a memory controller may include a block information storage configured to store information on a plurality of memory blocks included in a memory device including a plurality of planes, a super block manager configured to allocate and release super blocks, each including memory blocks belonging to two or more planes operating in parallel, based on the information on the memory blocks, and to provide the information on the super blocks to the block information storage, and a bad block manager configured to search for a bad block included in a super block to be allocated based on the information on the memory blocks and to provide information on a replacement block, of the same plane as the bad block, for replacing the bad block to the block information storage. The block information storage may update mapping information corresponding to a super block including the bad block based on the information on the replacement block and delete mapping information corresponding to a released super block based on information on the released super block received from the super block manager.

According to an embodiment of the present disclosure, a method of operating a memory controller for managing a plurality of memory blocks included in a memory device as a plurality of super blocks by grouping the plurality of memory blocks may include allocating a super block including memory blocks belonging to two or more planes each operating in parallel, changing mapping information so that a bad block included in the super block is replaced with a replacement block of the same plane as the bad block, releasing the super block, and deleting mapping information corresponding to the released super block. The plurality of memory blocks may be divided into user memory blocks grouped into the super blocks and reserved memory blocks that are not grouped into the super blocks, and the replacement block may be selected from a group consisting of memory blocks included in free super blocks of an empty status among the super blocks and the reserved memory blocks.

According to the present disclosure, a memory controller, a method of operating the memory controller, and a storage device capable of improving yield and performance of a memory device are provided.

BRIEF DESCRIPTION OF THE DRAWINGS

FIG. 2 is a diagram illustrating a memory device of FIG. 1.

FIG. 3 is a diagram illustrating a memory cell array of FIG. 2.

FIG. 4 is a diagram illustrating a storage device according to an embodiment of the present disclosure.

FIGS. 5 to 11 are diagrams illustrating allocation and release of a super block in a storage device according to an embodiment of the present disclosure.

FIGS. 14 to 16 are diagrams illustrating examples of information stored in a memory controller according to an embodiment of the present disclosure.

FIG. 17 is a diagram illustrating a memory controller according to another embodiment of the present disclosure.

DETAILED DESCRIPTION

Specific structural or functional descriptions of embodiments according to the concepts that are disclosed in the present specification or application are illustrated only to describe such embodiments. The embodiments according to the concepts of the present disclosure may be carried out in various forms and should not be construed as being limited to the embodiments described in the present specification or application.

Figure 1:
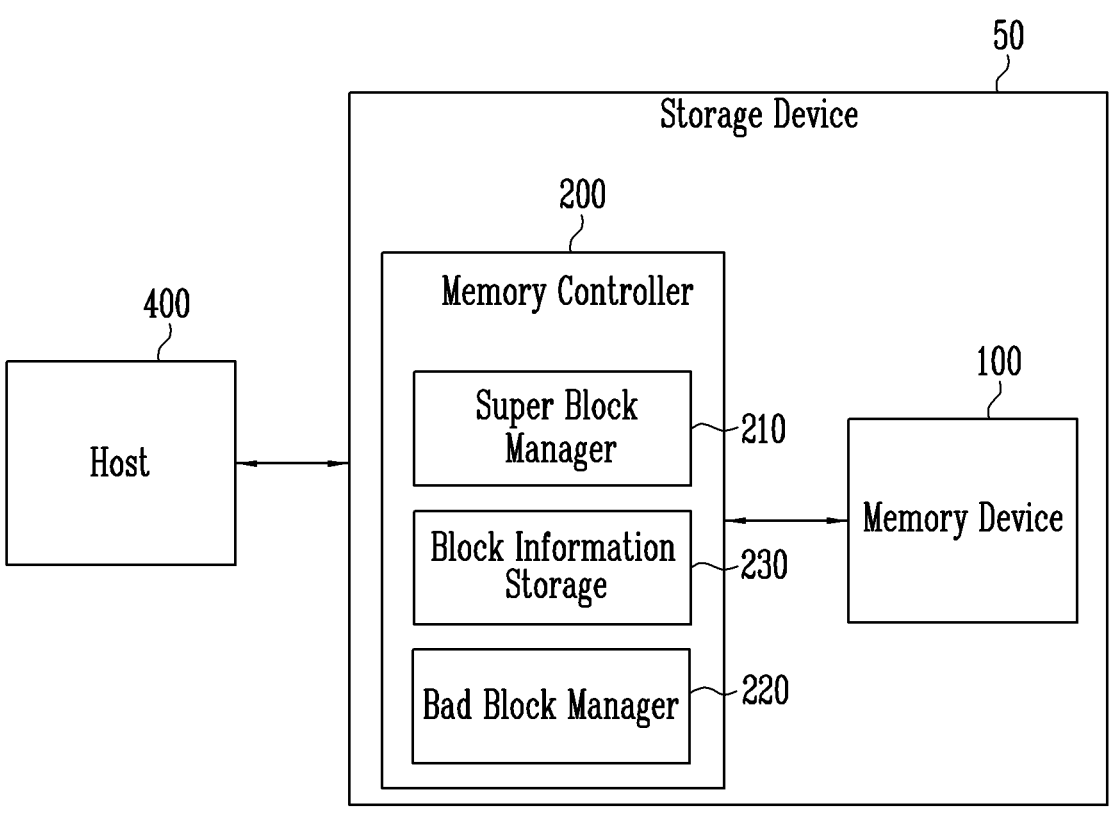
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200.

The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of a host 400 that stores high-capacity data in one place, such as a server or a data center. The storage device 50 may be manufactured as any one of various types of storage devices according to a host interface, which is a communication method with the host 400. In addition, the storage device 50 may be manufactured as any one of various types of packages.

The memory device 100 may store data. The memory device 100 may operate under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. Each memory block may include a plurality of pages. In an embodiment, a page may be a unit for storing data in the memory device 100 or reading data stored in the memory device 100. The memory block may be a unit for erasing data.

In an embodiment, the memory device 100 may be, for example, a volatile memory device or a nonvolatile memory device, and in the present specification, for convenience of description, it is assumed that the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address. The memory device is described in more detail with reference to FIGS. 2 and 3 below.

The memory controller 200 may control an overall operation of the storage device 50.

When power is applied to the storage device 50, the memory controller 200 may execute firmware such as a flash translation layer (FTL) for controlling communication between the host 400 and the memory device 100.

In an embodiment, the memory controller 200 may receive data and a logical address (LA) from the host 400 and may convert the LA into a physical address (PA) indicating an address of memory cells in which data included in the memory device 100 is to be stored.

The memory controller 200 may control the memory device 100 to perform a program operation, a read operation, or an erase operation according to a request of the host 400. During the program operation, the memory controller 200 may provide a program command, the PA, and data to the memory device 100. During the read operation, the memory controller 200 may provide a read command and the PA to the memory device 100. During the erase operation, the memory controller 200 may provide an erase command and the PA to the memory device 100.

In an embodiment, the memory controller 200 may generate a command, an address, and data independently or regardless of the request from the host 400 and transmit the command, the address, and the data to the memory device 100. For example, the memory controller 200 may provide, to the memory device 100, the command, the address, and the data for performing a program operation, a read operation, and an erase operation in connection with wear leveling, read reclaim, garbage collection, and similar operations.

In an embodiment, the memory controller 200 may control at least two or more memory devices 100. In this case, the memory controller 200 may control the memory devices 100 according to an interleaving method to improve operation performance. The interleaving method may be a method of controlling operations that overlap with each other for at least two memory devices 100. Alternatively, the interleaving method may be a method of controlling overlapping operations of a plurality of groups classified in one memory device 100, where a group may be a unit of one or more memory dies or a unit of one or more memory planes.

The memory controller 200 may include a super block manager 210. The memory controller 200 may manage memory blocks included in the memory device 100 by grouping memory blocks into a plurality of super blocks. In an embodiment, a super block may include memory blocks belonging to two or more planes, each operating in parallel. The super block manager 210 may allocate and release the super block.

In addition, the memory controller 200 may include a bad block manager 220. A portion of the memory blocks included in the memory device 100 may be one or more bad blocks. A bad block may refer to a defective memory block that cannot store data normally. In an embodiment, a bad block may be determined as having a defective status during production and testing processes of the memory device 100, and may be referred to as an initial bad block (IBB) or a manufacture bad block (MBB). Alternatively, the bad block may be a block detected as having a defective status according to a use of the memory device 100, in which case the block may be referred to as a growing bad block (GBB).

The bad block is a block having a defective status that cannot be used in a normal manner. Accordingly, when power is applied to the storage device 50, the memory controller 200 may receive information about a bad block stored in the memory device 100, and the bad block information may include information on an MBB. In addition, when a GBB occurs due to the use of the memory device 100, the bad block information may further include information on the GBB, and thus the memory controller 200 may update the bad block information received from the memory device 100. In addition, the memory controller 200 may access the memory device 100 according to the bad block information.

In an embodiment, when a bad block is included in a super block to be allocated by the super block manager 210, the bad block may not be used, and thus the bad block manager 220 may replace the bad block with a replacement block. The replacement block may be a memory block included in the same plane as the bad block. The memory controller 200 may control the memory device 100 in an interleaving method in which the memory device 100 operates in parallel between different planes.

In addition, the memory controller 200 may include a block information storage 230. The block information storage 230 may store information on the memory blocks included in the memory device 100. For example, the information on the memory blocks may include the above-described bad block information. In addition, the information on the memory blocks may include mapping information about the memory blocks included in the super blocks, information about the status of the memory blocks, and the like.

The super block manager 210 may allocate and release the super block based on the information on the memory blocks stored in the block information storage 230. In addition, the super block manager 210 may provide information on the super blocks to the block information storage 230 after allocating and releasing the super block.

The bad block manager 220 may replace the bad block with the replacement block based on the information on the memory blocks stored in the block information storage 230. In addition, the bad block manager 220 may provide information on the replacement block to the block information storage 230 after replacing the bad block with the replacement block.

The block information storage 230 may update mapping information corresponding to a super block including a bad block based on the information on the replacement block received from the bad block manager 220. In addition, the block information storage 230 may delete mapping information corresponding to a released super block based on information on the released super block received from the super block manager 210.

Figure 2:
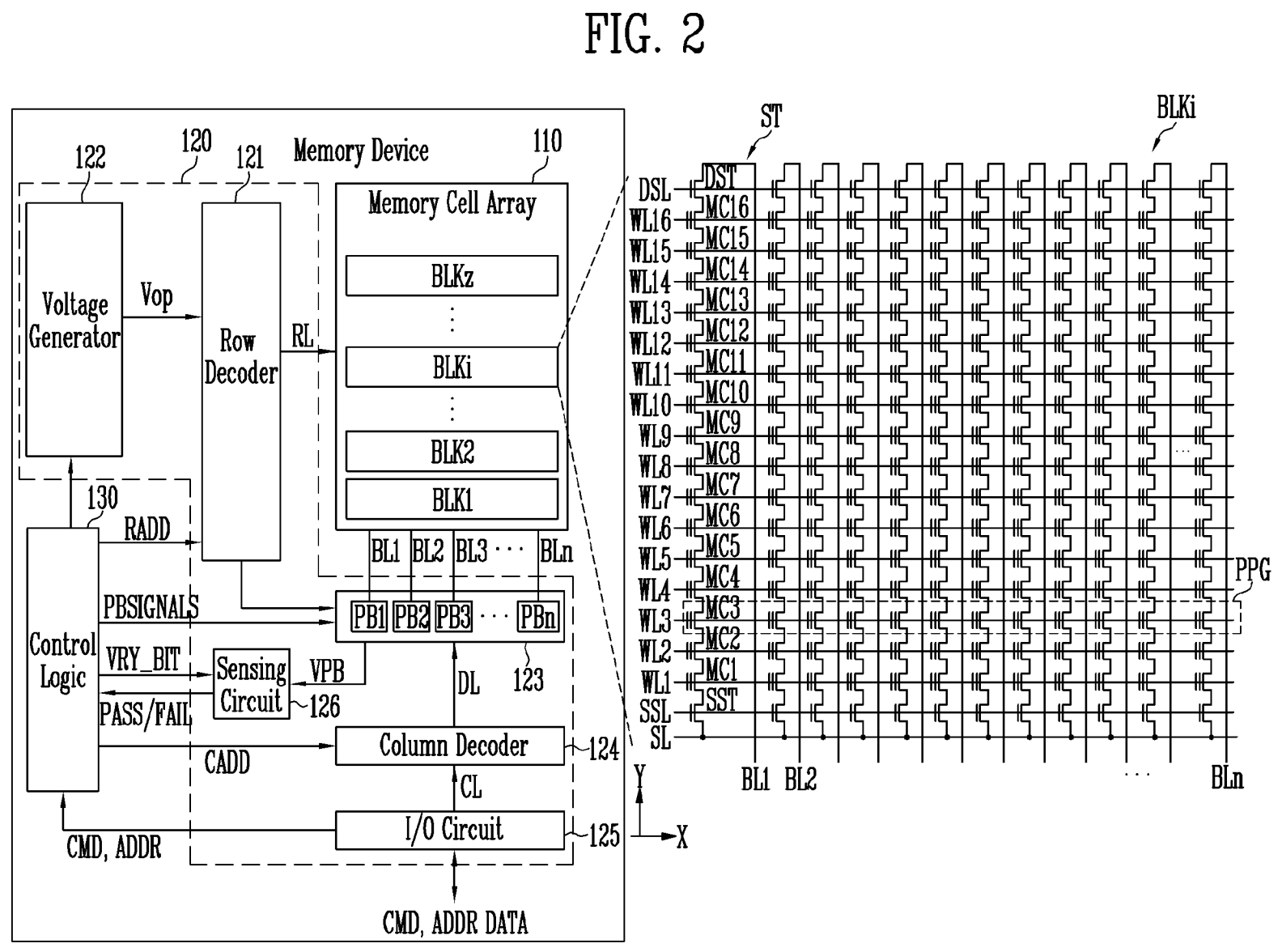

FIG. 2 is a diagram illustrating a memory device of FIG. 1.

Referring to FIG. 2, a memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to a row decoder 121 through row lines RL. Here, the row lines RL may include at least one source select line, a plurality of word lines, and at least one drain select line. The plurality of memory blocks BLK1 to BLKz may be connected to a page buffer group 123 through bit lines BL1 to BLn. Each of the plurality of memory blocks BLK1 to BLKz may include a plurality of memory cells. In an embodiment, the plurality of memory cells may be nonvolatile memory cells. Memory cells connected to the same word line may be defined as one page. Therefore, one memory block may include a plurality of pages.

In any one memory block BLKi, from among the plurality of memory blocks, a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16. In other embodiments, a string may include more memory cells that illustrated in FIG. 2.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to a plurality of word lines WL1 to WL16 respectively. A group of the memory cells connected to the same word line, from among the memory cells included in different strings ST, may be referred to as a physical page PPG. Therefore, a memory block BLKi may include the physical pages PPG associated with the word lines WL1 to WL16.

Each of the memory cells included in the memory cell array 110 may be configured as a single level cell (SLC) that stores one data bit, a multi-level cell (MLC) that stores two data bits, a triple level cell (TLC) that stores three data bits, or a quad level cell (QLC) that stores four data bits.

The SLC may store one bit of data. One physical page PPG of the SLC may store one logical page data. One logical page data may include data bits corresponding to the number of cells included in one physical page PPG.

The MLC, the TLC, and the QLC may store two or more bits of data. In this case, one physical page PPG may store two or more logical page data.

A memory block or a portion of a memory block from among the memory blocks BLK1 to BLKz may be the unusable bad block. The memory cell array 110 may store the information on the bad block in some area of the memory cell array 110.

In an embodiment, the memory blocks BLK1 to BLKz may be divided into user memory blocks and reserved memory blocks. A user memory block may be a memory block grouped into the super blocks by the memory controller, and a reserved memory block may be a memory block that is not grouped into the super blocks. The user memory block may be a memory block in which user data is stored, and the reserved memory block may be a memory block for replacing the user memory block when the user memory block is a bad block. In addition, in an embodiment, the memory blocks BLK1 to BLKz may further include a dummy memory block that does not store data. In addition, in an embodiment, the memory blocks BLK1 to BLKz may further include a CAM (Content Addressable Memory) memory block that stores CAM data.

The peripheral circuit 120 may be configured to perform a program operation, a read operation, or an erase operation on a selected area of the memory cell array 110 under control of the control logic 130. That is, the peripheral circuit 120 may drive the memory cell array 110 under the control of the control logic 130. For example, the peripheral circuit 120 may apply various operation voltages to the row lines RL and the bit lines BL1 to BLn or discharge the applied voltages under the control of the control logic 130.

Specifically, the peripheral circuit 120 may include a row decoder 121, a voltage generator 122, a page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In addition, the row lines RL may further include a pipe select line.

The row decoder 121 may be configured to operate in response to the control of the control logic 130. The row decoder 121 may receive a row address RADD from the control logic 130. Specifically, the row decoder 121 may be configured to decode the row address RADD. The row decoder 121 may select at least one of the memory blocks BLK1 to BLKz according to a decoded row address RADD. In addition, the row decoder 121 may select at least one word line of the memory block, selected to apply the voltages generated by the voltage generator 122, to at least one word line according to the decoded address.

For example, during the program operation, the row decoder 121 may apply the program voltage to a selected word line and apply a program pass voltage of a level lower than that of the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage higher than the read voltage to the unselected word line.

In an embodiment, the erase operation of the memory cell array 110 may be performed in a memory block unit. During the erase operation, the row decoder 121 may select one memory block according to the decoded address, and the row decoder 121 may apply a ground voltage to word lines connected to the selected memory block.

The voltage generator 122 may operate in response to the control of the control logic 130. The voltage generator 122 may be configured to generate a plurality of voltages using an external power voltage supplied to the memory device 100. For example, the voltage generator 122 may generate the program voltage, the verify voltage, the pass voltage, the read voltage, the erase voltage, and the like in response to the control of the control logic 130. That is, the voltage generator 122 may generate various operation voltages Vop used for the program, read, and erase operations in response to an operation signal.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages using the external power voltage or the internal power voltage. For example, the voltage generator 122 may include a plurality of pumping capacitors that receive the internal power voltage, and may selectively activate the plurality of pumping capacitors to generate the plurality of voltages, in response to the control of the control logic 130. In addition, the generated voltages may be supplied to the memory cell array 110 by the row decoder 121.

The page buffer group 123 may include first to n-th page buffers PB1 to PBn. The first to n-th page buffers PB1 to PBn may be connected to the memory cell array 110 through the first to n-th bit lines BL1 to BLn, respectively. In addition, the first to n-th page buffers PB1 to PBn may operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

Specifically, during the program operation, when a program pulse is applied to the selected word line, the first to n-th page buffers PB1 to PBn may transfer data DATA received through the input/output circuit 125 to the selected memory cells through the first to n-th bit lines BL1 to BLn. The memory cells of the selected page may be programmed according to the transferred data DATA. Memory cells of a page selected according to the transferred data DATA may be programmed. A memory cell connected to a bit line to which a program allowable voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to n-th page buffers PB1 to PBn may read page data from the selected memory cells through the first to n-th bit lines BL1 to BLn.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer a command CMD and an address ADDR received from the memory controller 200 to the control logic 130, or may exchange the data DATA with the column decoder 124.

The sensing circuit 126 may generate a reference current in response to an allowable bit signal VRY_BIT during the read operation or the verify operation, and compare a sensing voltage VPB received from the page buffer group 123 with a reference voltage generated by the reference current to output a pass signal PASS or a fail signal FAIL.

The control logic 130 may output the operation signal, the row address RADD, the page buffer control signals PBSIGNALS, and the allowable bit signal VRY_BIT in response to the command CMD and the address ADDR to control the peripheral circuit 120.

Figure 3:
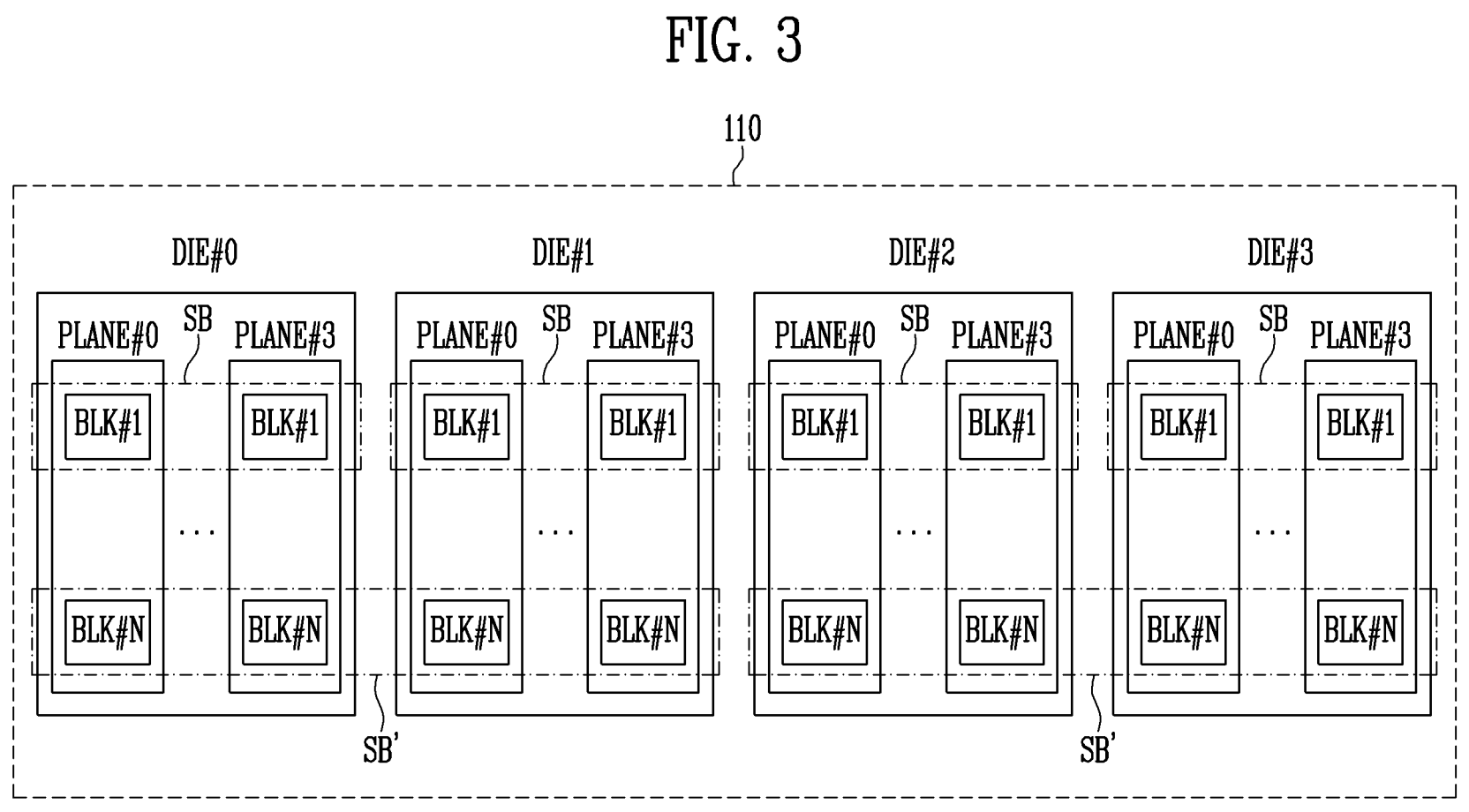

FIG. 3 is a diagram illustrating a memory cell array of FIG. 2.

Referring to FIGS. 2 and 3, a memory cell array 110 may include one or more memory dies, and each memory die may include a plurality of planes including a plurality of memory blocks. In FIG. 3, the memory cell array 110 is shown as including four memory dies DIE #0, DIE #1, DIE #2, and DIE #3, but the number of memory dies is not limited thereto. The plurality of memory dies may perform transmission and reception with the memory controller through a plurality of channels, and each channel may be connected to one or more memory dies. For example, when one channel is connected to one memory die, one memory die may receive one command at once, and planes included in one memory die may process the command received by the memory die in parallel. That is, memory blocks belonging to different planes may operate in parallel.

The memory controller 200 may control the memory cell array 110 of the memory device 100 by dividing the memory cell array 110 into a plurality of super blocks. That is, the memory controller 200 may manage the plurality of memory blocks of the memory cell array 110 by grouping the plurality of memory blocks into the plurality of super blocks. Each of the super blocks may include a plurality of memory blocks. Each of the super blocks may include memory blocks belonging to two or more planes. For example, in FIG. 3 a super block SB may include one memory block included in planes 0 to 3 for each memory die, and thus a super block SB may be formed for each memory die. Alternatively in FIG. 3, a super block SB' may include memory blocks included in two different memory dies. In addition, although not shown in FIG. 3, in another embodiment, the super block may be configured to include only a portion of each of memory blocks included in different memory dies. In an embodiment, data to be stored in each super block may be sequentially stored in each of the super blocks, but the disclosure is not limited thereto.

Figure 4:
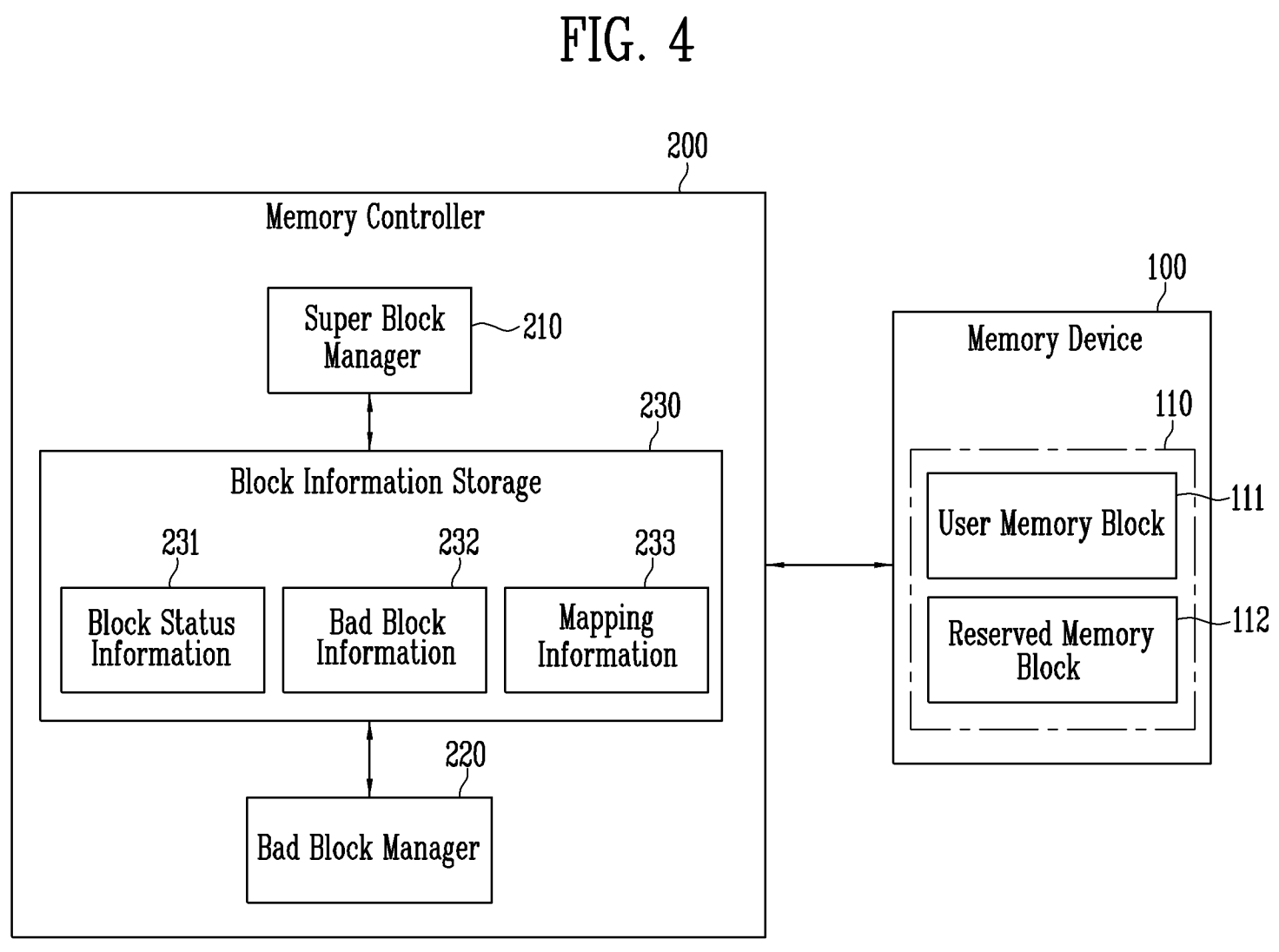

FIG. 4 is a diagram illustrating a storage device according to an embodiment of the present disclosure.

Referring to FIG. 4, a memory cell array 110 of a memory device 100 may include user memory blocks 111, which are memory blocks in which user data is stored, and reserved memory blocks 112, which are memory blocks for replacing the user memory blocks that are also bad blocks. The user memory blocks 111 may be grouped into the super blocks and managed by the memory controller 200. The reserved memory blocks 112 may be used only to replace the user memory blocks which are the bad blocks, and may not be grouped into the super blocks by the memory controller 200.

The memory controller 200 may include the super block manager 210, the block information storage 230, and the bad block manager 220.

The block information storage 230 may store the information on the memory blocks. In an embodiment, the block information storage 230 may include block status information 231 indicating a status of the super blocks. The block status information 231 may include information indicating whether the super blocks are allocated and information indicating a data storage current situation of the super blocks. The information indicating the data storage current situation of the super blocks may indicate a free status in which data is not stored in the super blocks and the super blocks are empty, an open status in which data is stored in some of the super blocks, or a full status in which data is stored in all of the super blocks. In an embodiment, the memory controller 200 may control the memory device 100 so that the number of super blocks in free status is maintained at a predetermined or larger number.

In addition, the block status information 231 may include information indicating whether the memory block included in the super blocks is used as the replacement block for replacing a bad block and information indicating an erase count of each of the super blocks. In addition, the block status information 231 may further include information indicating an erase count of each of the memory blocks. When the memory blocks are grouped into the super blocks and managed, the erase count of memory blocks included in one super block may be equally maintained, and thus the erase count may be managed for each super block. However, according to an embodiment of the present disclosure, only one of the memory blocks included in any one super block of the free status may be used as the replacement block, and thus the erase counts of the memory blocks in one super block may be different from each other. Accordingly, in an embodiment, the erase count of each of the memory blocks may be separately stored. In addition, the erase count of the super blocks may be expressed as the largest value from among the erase count values of the memory blocks included in each of the super blocks.

The block information storage 230 may include bad block information 232 indicating information on the bad block. The bad block information 232 may include information indicating a position of the bad block. The bad block information 232 may include information on the MBB and information on the GBB. When power is applied to the storage device, the block information storage 230 may receive the information on the MBB from the memory device 100. In addition, when the GBB occurs during an operation of the memory device, the block information storage 230 may receive the information on the GBB from the memory device 100.

The block information storage 230 may store mapping information 233 indicating a mapping relationship of the super blocks. The mapping information 233 may include information on memory blocks included in a super block to be allocated. When a portion of the memory blocks included in the super block to be allocated is determined as the bad block, and the bad block is replaced with the replacement block, the mapping information 233 may include information indicating that the bad block of the super block to be allocated has been replaced with the replacement block. The information indicating that the bad block of the super block to be allocated is replaced with the replacement block may include, for example, position information of the bad block previously included in the super block and position information of the replacement block.

The super block manager 210 may allocate and release the super block with respect to the plurality of user memory blocks 111. The super block may include memory blocks belonging to two or more planes each operating in parallel. The plurality of user memory blocks 111 to which the super block is to be allocated may independently perform a memory operation for each plane, and thus user memory blocks 111 of different planes included in the super block may simultaneously perform the memory operation in parallel.

In an embodiment, the super block manager 210 may allocate or release the super block in response to a request from outside the memory controller 200. Alternatively, in another embodiment, the super block manager 210 may allocate or release the super block by itself through the memory controller 200.

In an embodiment, the super block manager 210 may allocate and release the super block based on the information on the memory blocks stored in the block information storage 230. More specifically, the super block manager 210 may allocate and release the super block based on the block status information 231 and the mapping information 233 stored in the block information storage 230. The super block manager 210 may allocate the super block by designating the super block in which data is to be stored, from among the super blocks, in which the block status information 231 indicates a free status, and thus data may be stored in the allocated super block. The block status information 231 of the super block in which data is stored may be updated to indicate an open status. The super block manager 210 may allocate the super block according to a priority set based on the block status information 231.

When the super block manager 210 allocates the super block, the super block manager 210 may provide information on the allocated super block to the block information storage 230. The block information storage 230 may update the block status information 231 and the mapping information 233 based on the information on the super block received from the super block manager 210. When the super block manager 210 releases the super block, the super block manager 210 may provide information on the released super block to the block information storage 230. The block information storage 230 may update the block status information 231 and the mapping information 233 based on the information on the super block received from the super block manager 210. Accordingly, the mapping information 233 on the released super block may be deleted.

The bad block manager 220 may search for a bad block included in the super block to be allocated. The bad block manager 220 may check whether a bad block is included in the super block to be allocated and the position of the bad block based on the information on the memory blocks stored in the block information storage 230. More specifically, the bad block manager 220 may search for the bad block included in the super block based on the bad block information 232 and the mapping information 233 stored in the block information storage 230.

The bad block manager 220 may replace the bad block included in the super block, which is to be allocated, with the replacement block. That is, the bad block manager 220 may designate the replacement block capable of replacing the bad block based on the information on the memory blocks stored in the block information storage 230. The bad block manager 220 may designate a memory block positioned on the same plane as the bad block as the replacement block. The replacement block may be a memory block of the same plane as the bad block. Accordingly, even though the bad block is replaced with the replacement block, the memory device 100 may continuously operate in parallel between different planes.

The replacement block may be selected from a group consisting of the memory blocks included in the free super blocks of the empty status among the super blocks configured of the user memory block 111, and the reserved memory block 112. In an embodiment, the bad block manager 220 may preferentially select the replacement block from among the reserved memory blocks 112. When all reserved memory blocks 112 of the same plane as the bad block are already used as the replacement blocks, the bad block manager 220 may select the replacement block from among the memory blocks included in the free super blocks with empty status. When selecting the replacement block from among the memory blocks included in the free super blocks, the bad block manager 220 may preferentially select memory blocks in a super block with lower priority for allocation as the replacement block.

The bad block manager 220 may provide the information on the selected replacement block to the block information storage 230. Accordingly, the block information storage 230 may update the block status information 231 and the mapping information 233. More specifically, the mapping information corresponding to the super block including the bad block may be updated, and status information of the super block including the bad block, the super block including the replacement block, and/or the replacement block itself may be updated.

When the replacement block is selected from among the memory blocks included in the free super blocks, the status information of the free super block including the replacement block may be updated. That is, information indicating that the memory block included in the free super block is used as the replacement block may be stored in the block information storage 230. When the super block manager 210 allocates the super block, the free super block, in which the information that the memory block is used as the replacement block is stored, may have the lowest priority for the super block allocation. Accordingly, the super block manager 210 may preferentially allocate a free super block that does not include the replacement block.

In addition, when the super block manager 210 allocates the super block, the super block manager 210 may further consider the erase count included in the block status information 231. That is, the free super block may be allocated in consideration of the erase count of the super blocks included in the block status information 231 or the erase count of each of the memory blocks included in the super blocks. Here, the erase count of the super blocks may be expressed as the largest value from among erase count values of the memory blocks included in each of the super blocks. For example, the super block manager 210 may preferentially allocate a free super block having the smallest erase count. The super block having the smallest erase count may mean a super block having the smallest maximum erase count values of the memory blocks included in the super block, from among the plurality of super blocks.

FIGS. 5 to 11 are diagrams illustrating allocation and release of a super block in a storage device according to an embodiment of the present disclosure.

Referring to FIGS. 4 and 5, the memory device 100 may include one or more memory dies, and each memory die may include a plurality of planes Plane 0 to Plane 3. Each of the plurality of planes Plane 0 to Plane 3 may include a plurality of memory blocks. The memory blocks may be divided into the user memory blocks 111 and the reserved memory blocks 112.

The super block manager 210 may allocate a super block 1 (SB 1) from among the super blocks, which include user memory blocks 111. In FIG. 5, the super block 1 (SB 1) may include memory blocks 4 to 7 (Block 4 to Block 7). The memory blocks 4 to 7 (Block 4 to Block 7) included in the super block 1 (SB 1) may belong to different memory planes Plane 0 to Plane 3, respectively. In FIG. 5, memory block 5 (Block 5) included in the super block 1 (SB 1) may be the bad block.

Figure 6:
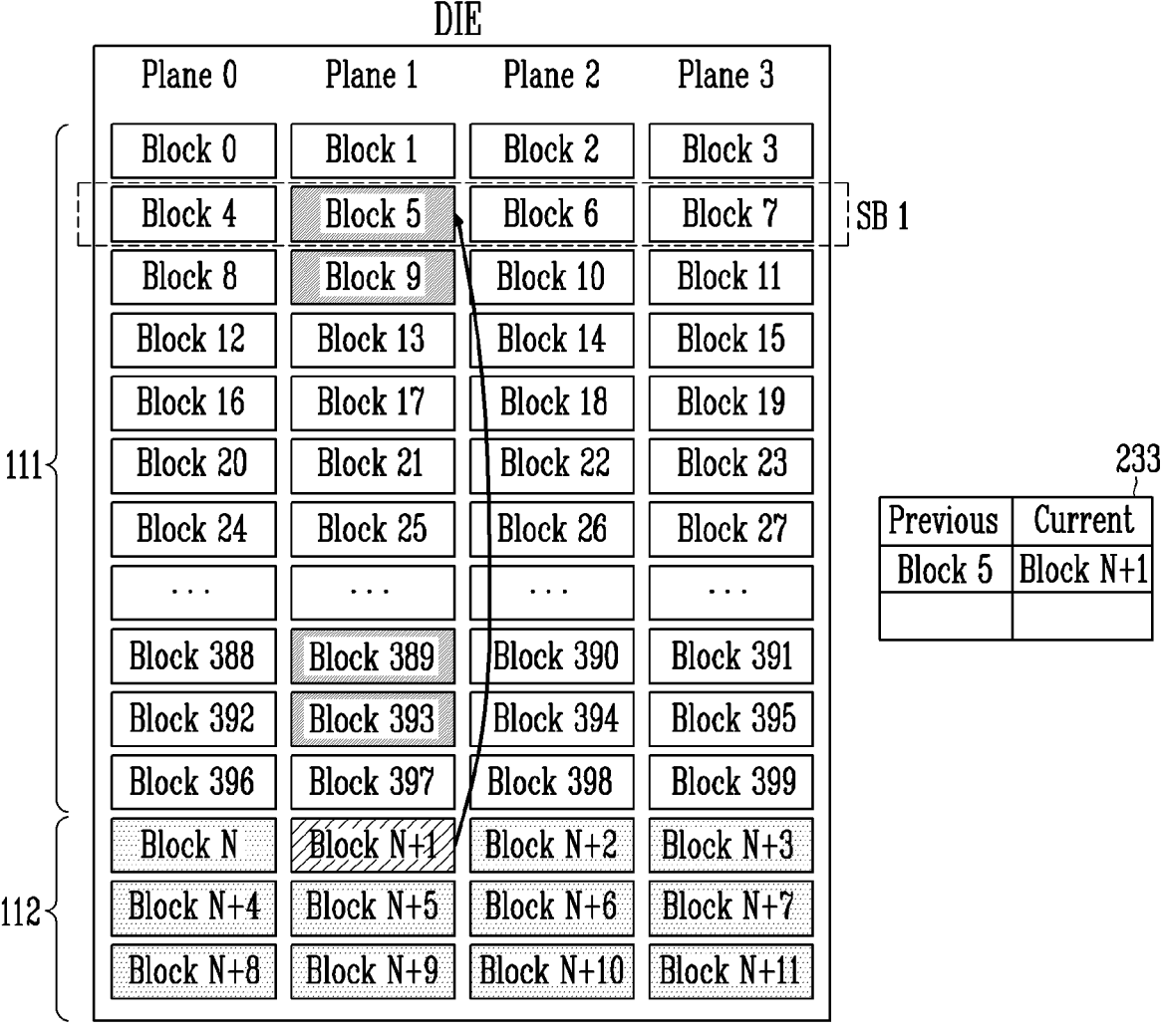

Referring to FIGS. 4 and 6, the bad block manager 220 may search whether the bad block is included in SB 1. The bad block manager 220 may confirm that Block 5 is the bad block.

Accordingly, the bad block manager 220 may select a replacement block to replace Block 5, which is the bad block. The bad block manager 220 may select a replacement block from among the memory blocks included in the free super blocks and the reserved memory block 112. The bad block manager 220 may select a memory block belonging to the same plane as the bad block as the replacement block.

In an embodiment, the bad block manager 220 may preferentially set the replacement block from among the reserved memory blocks 112. Accordingly, the bad block manager 220 may select a memory block N+1 (Block N+1) which is a reserved memory block 112 that belongs to the plane 1, to which Block 5 also belongs, as the replacement block.

When the replacement block is selected, the bad block manager 220 may provide the information on the replacement block to the block information storage 230, and thus the block information storage 230 may update the mapping information 233. The mapping information 233 may include information indicating that the memory block 5 included in the existing super block 1 is replaced with the memory block N+1. For example, the mapping information 233 may include position information of Block 5 previously included in SB 1 and position information of Block N+1, which is the replacement block newly included in the super block SB 1.

Figure 7:
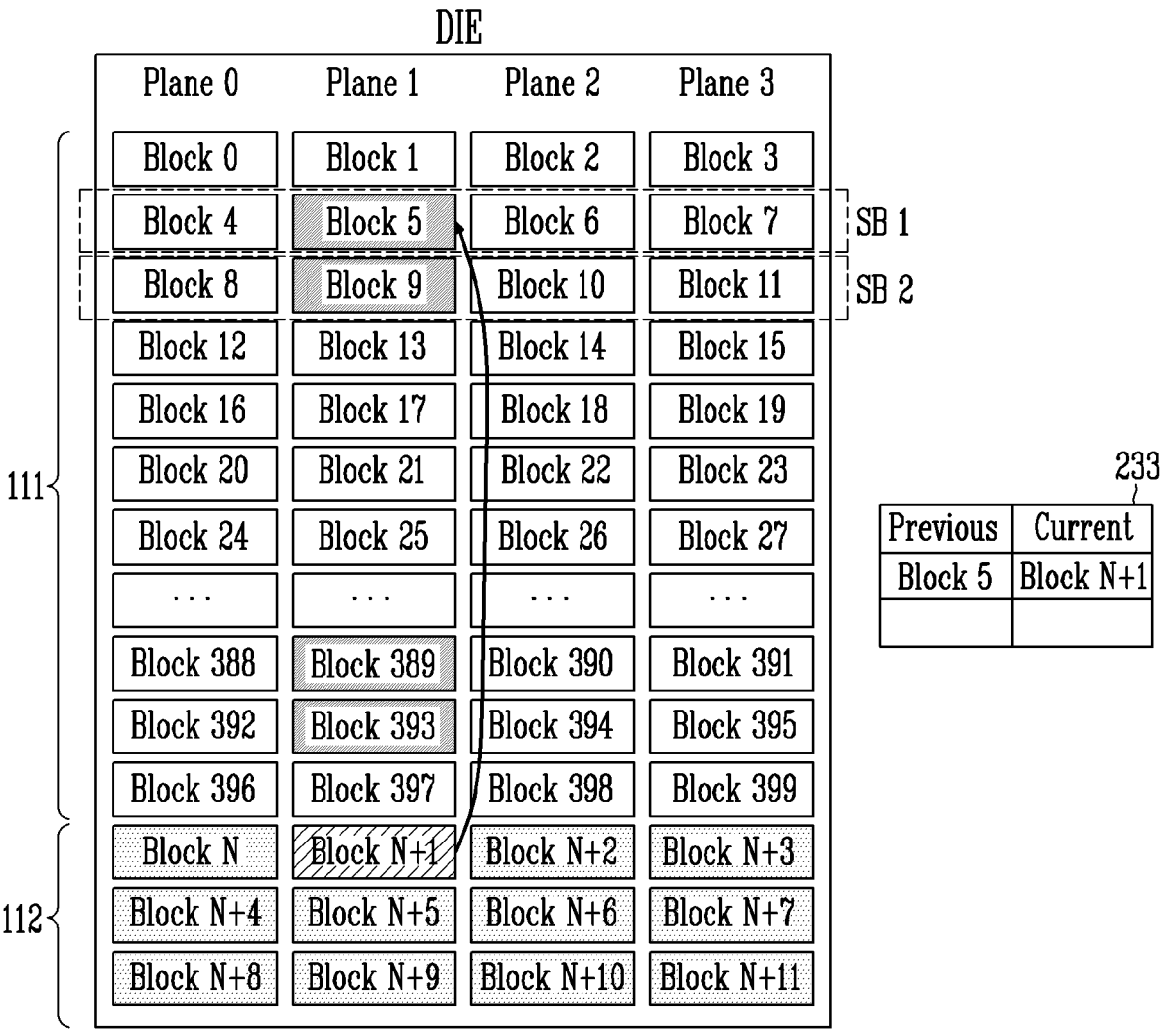

Referring to FIGS. 4 and 7, the super block manager 210 may allocate a super block 2 (SB 2) from among the free super blocks, which include the user memory blocks 111. The super block 2 (SB 2) may include memory blocks 8 to 11 (Block 8 to Block 11). The memory blocks 8 to 11 included in the super block 2 may belong to the different memory planes Plane 0 to Plane 3, respectively. Here, a memory block 9 (Block 9) included in the super block 2 (SB 2) may be the bad block.

Figure 8:
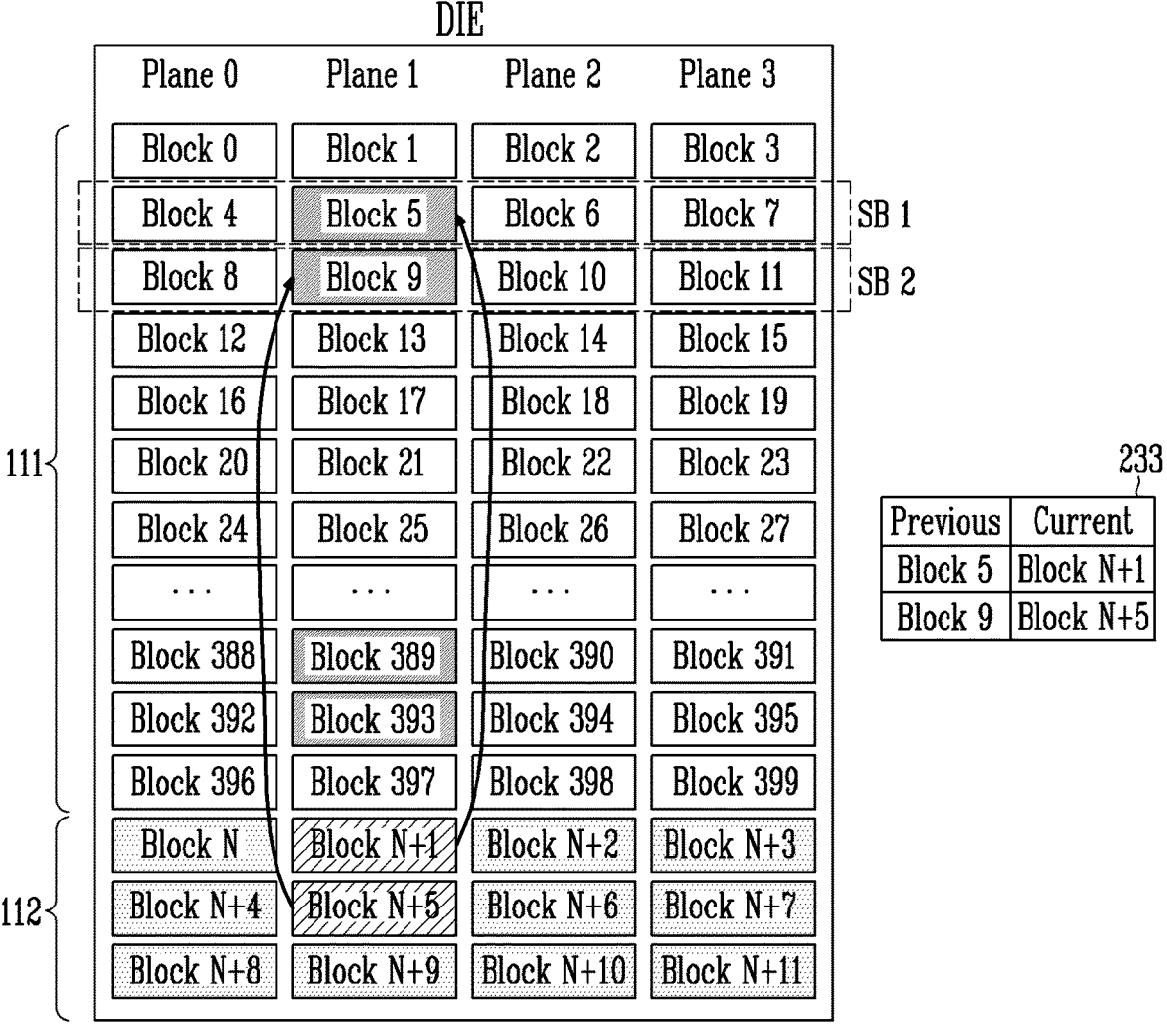

Referring to FIGS. 4 and 8, the bad block manager 220 may search whether the bad block is included in the super block 2 (SB 2). The bad block manager 220 may confirm that the memory block 9 is the bad block.

Accordingly, the bad block manager 220 may select a replacement block to replace the memory block 9, which is the bad block. In an embodiment, the bad block manager 220 may select a memory block N+5, which is a reserved memory block 112 that also belongs to the plane 1 like the memory block 9. The replacement block is not, however, the memory block Block N+1, which is already used as the replacement block for bad Block 5.

When the replacement block is selected, the bad block manager 220 may provide the information on the replacement block to the block information storage 230, and thus the block information storage 230 may update the mapping information 233. The mapping information 233 may include information indicating that the memory block 9 (Block 9) included in the existing super block 2 (SB 2) is replaced with the memory block N+5 (Block N+5). For example, the mapping information 233 may include position information of Block 9 previously included in SB 2 and position information of Block N+5, which is the replacement block newly included in SB 2.

Figure 9:
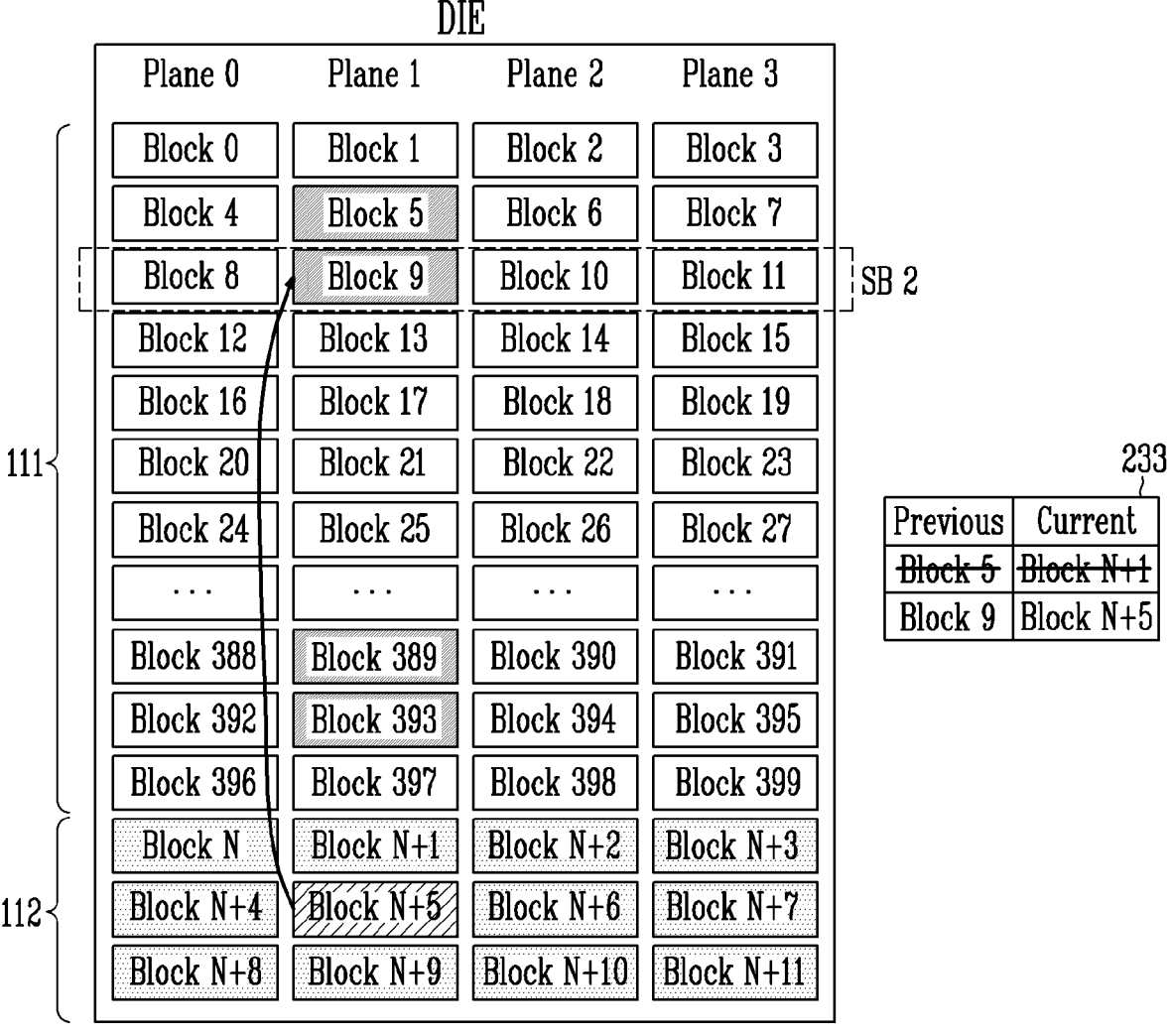

Referring to FIGS. 4 and 9, the super block manager 210 may release the super block 1 (SB 1). The super block manager 210 may provide information indicating that the super block 1 (SB 1) is released to the block information storage 230, and thus the block information storage 230 may update the mapping information 233. Accordingly, among the mapping information 233 corresponding to the super block 1, information indicating that the memory block 5 (Block 5) is replaced with the memory block N+1 (Block N+1) may be deleted.

Figure 10:
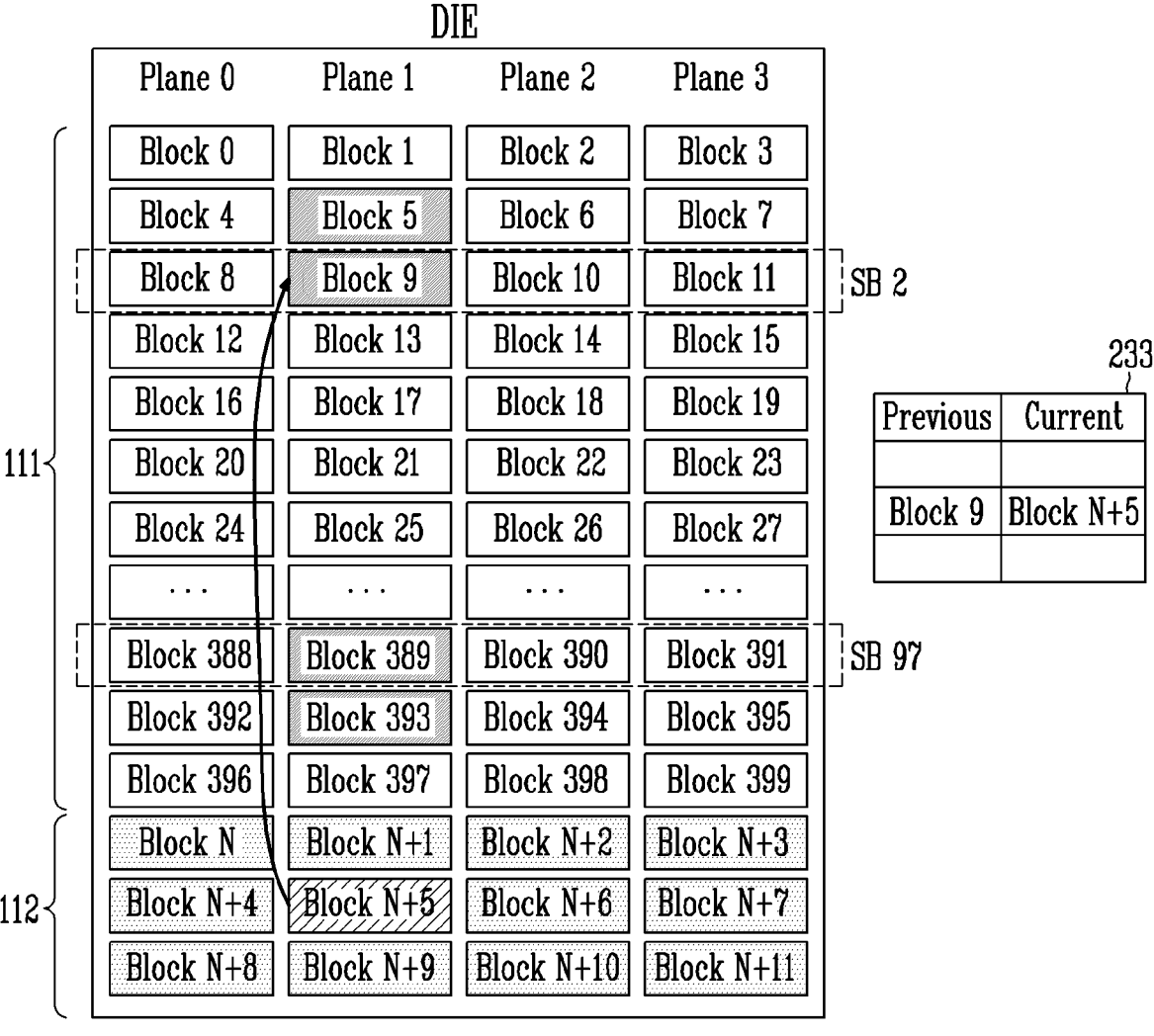

Referring to FIGS. 4 and 10, the super block manager 210 may allocate a super block 97 (SB 97) from among the free super blocks including the user memory blocks 111. The super block 97 (SB 97) may include memory blocks 388 to 391 (Block 388 to Block 391). The memory blocks 388 to 391 (Block 388 to Block 391) included in the super block 97 (SB 97) may belong to the different memory planes Plane 0 to Plane 3, respectively. Here, the memory block 389 (Block 389) included in the super block 97 (SB 97) may be the bad block.

Figure 11:
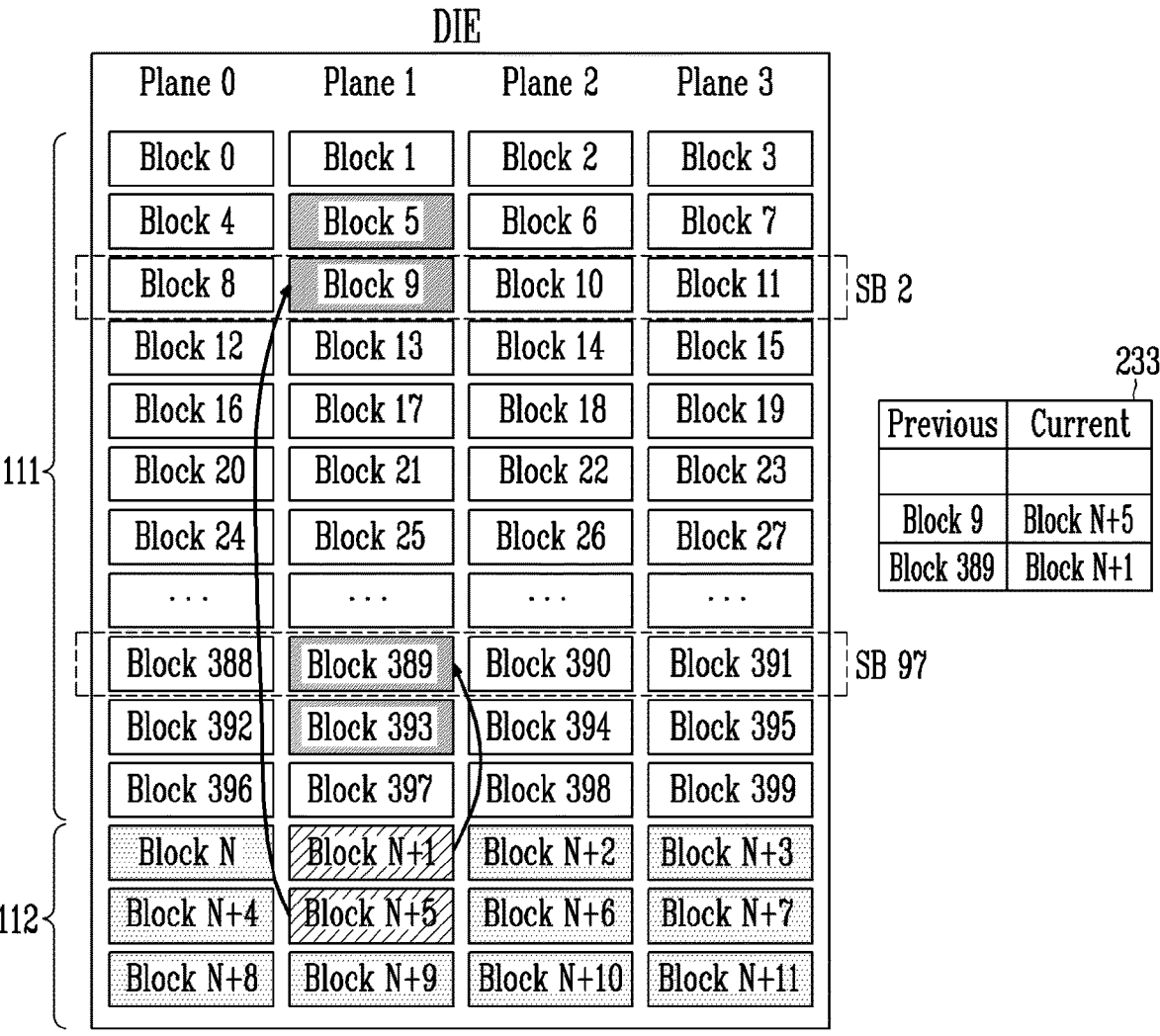

Referring to FIGS. 4 and 11, the bad block manager 220 may search whether the bad block is included in the super block 97 (SB 97). The bad block manager 220 may confirm that the memory block 389 is the bad block.

Accordingly, the bad block manager 220 may select a replacement block to replace the memory block 389 (Block 389), which is the bad block. In an embodiment, the bad block manager 220 may select the memory block N+1 (Block N+1), which is a reserved memory block 112 that belongs to the plane 1 like the memory block 389 (Block 389). The replacement block is not, however, the memory block Block N+5, which is already used as the replacement block for bad Block 9. The memory block N+1 (Block N+1) was used as the replacement block when the super block 1 (SB 1) was allocated (see, e.g., FIG. 7), but after the super block 1 (SB 1) is released, the memory block N+1 (Block N+1) may be used as a replacement block again.

When the replacement block is selected, the bad block manager 220 may provide information on the replacement block to the block information storage 230, and thus the block information storage 230 may update the mapping information 233. The mapping information 233 may include information indicating that Block 389 included in super block SB 97 is replaced with Block N+1. For example, the mapping information 233 may include position information of Block 389 previously included in the existing super block SB 97 and position information of Block N+1, which is the replacement block newly included in super block SB 97.

In comparative examples, the number of replacement blocks respectively corresponding to bad blocks is fixed. Therefore, when the number of MBBs in one plane exceeds a preset number of reserved memory blocks 112, the corresponding memory device 100 may not be used. In addition, because GBBs occur during a use of the memory device 100, when a sum of the MBB and the GBB exceeds the preset number of reserved memory blocks 112, the memory device 100 may not operate in an interleaving method with respect to different planes, and performance deteriorates.

The storage device according to an embodiment of the present disclosure may dynamically set the replacement block corresponding to the bad block instead of fixing the replacement block corresponding to the bad block in advance. To do so, the storage device may check presence of the bad block whenever the super block is allocated, map the bad block to the replacement block, and disconnect mapping between the bad block and the replacement block when the super block is released. Accordingly, a yield of the memory device 100 may be improved by increasing the allowable number of MBB allowed per plane, and performance deterioration of the memory device 100 due to occurrence of the GBB may be improved.

When the storage device, the memory controller, and the method of operating the memory controller according to the present disclosure are used, performance of the storage device 50 might not deteriorate and constant performance may be maintained even though the number of MBBs exceeds the number of reserved memory blocks 112. The number of MBBs may be inferred based on a specification of a product, a capacity of the storage device 50, and a size of the memory blocks included in the memory device 100. In addition, the number of entire reserved memory blocks 112 may be inferred based on the capacity of the storage device 50 and the size of the memory blocks included in the memory device 100. For example, the number of entire reserved memory blocks 112 may be inferred based on the capacity of the storage device 50 and the size of the memory blocks included in the memory device 100, and the number of MBBs may be estimated based on a difference between the number of entire reserved memory blocks 112 and the number of usable reserved memory blocks 112 mentioned in the specification of the product.

Figure 12:
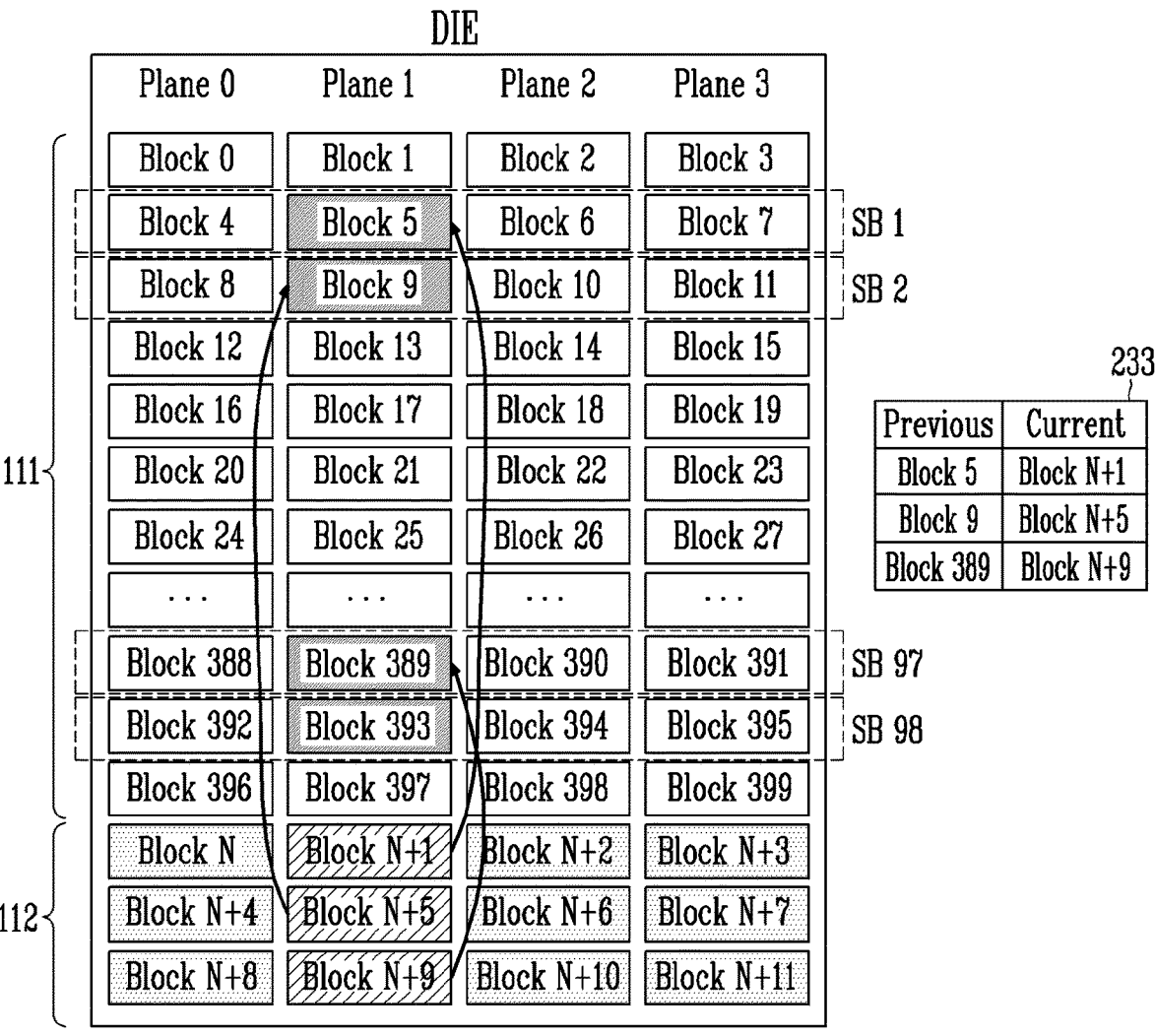
FIGS. 12 and 13 are diagrams illustrating replacement of a bad block in a storage device according to an embodiment of the present disclosure.
Figure 13:
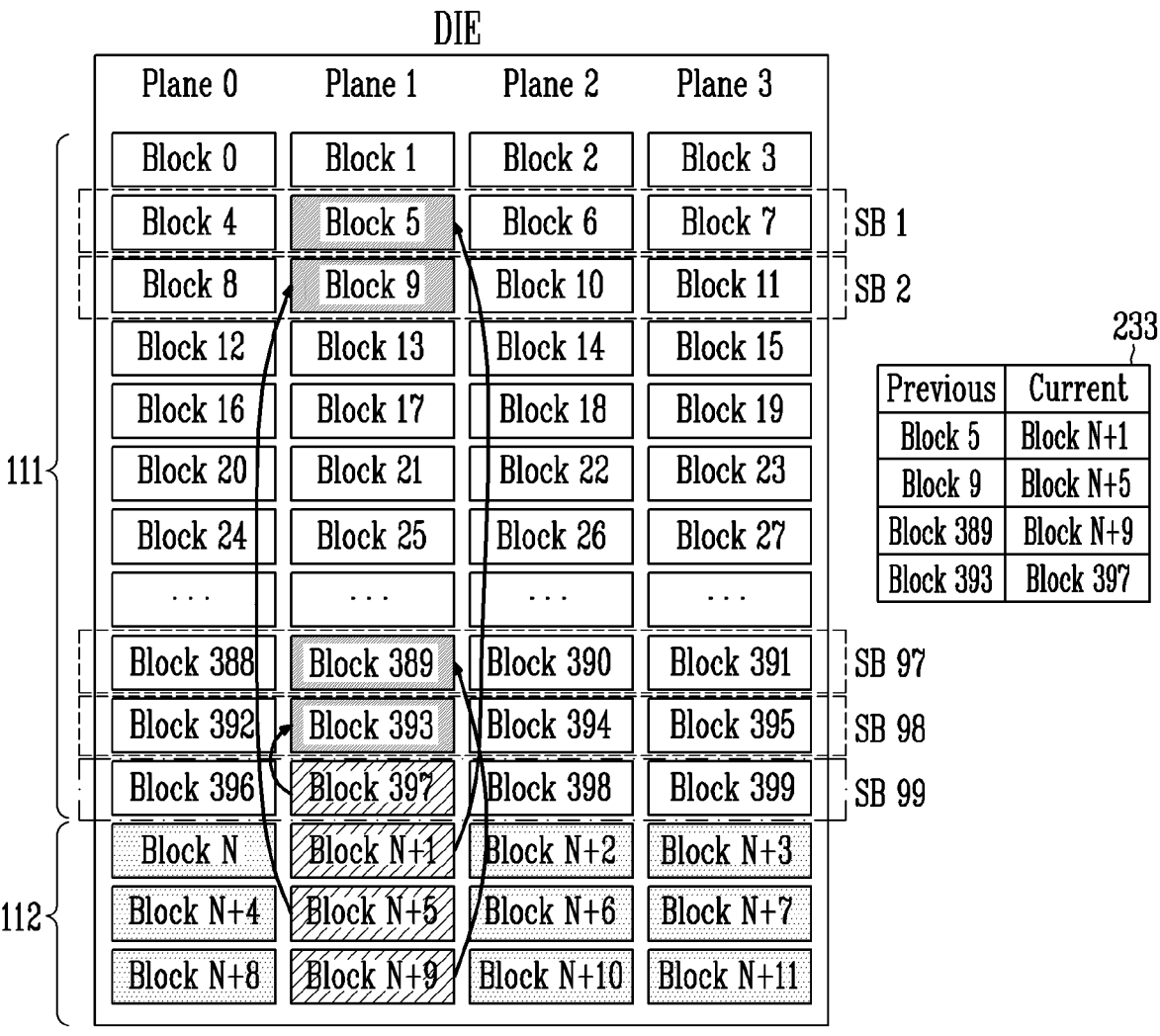

FIGS. 12 and 13 are diagrams illustrating replacement of a bad block in a storage device according to an embodiment of the present disclosure.

Referring to FIGS. 4 and 12, the super block 1 (SB 1), the super block 2 (SB 2), and the super block 97 (SB 97) may be already allocated, and thus may be in a status in which data is stored. When the super block 1, the super block 2, and the super block 97 are allocated, the memory block 5 (Block 5), the memory block 9 (Block 9), and the memory block 389 (Block 389), which are the bad blocks included in the respective the super block 1, the super block 2, and the super block 97, may be replaced, respectively, with the memory block N+1 (Block N+1), the memory block N+5 (Block N+5), and the memory block N+9 (Block N+9), which are reserved memory blocks belonging to the plane 1. Information indicating that the bad blocks in the super blocks to be allocated are replaced with the replacement blocks as described above may be included in the mapping information 233 stored in the block information storage 230.

Subsequently, the super block manager 210 may newly allocate a super block 98 (SB 98) from among the free super blocks including the user memory blocks 111. The super block 98 (SB 98) may include memory blocks 392 to 395 (Block 392 to Block 395). The memory blocks 392 to 395 (Block 392 to Block 395) included in the super block 98 (SB 98) may belong to the different memory planes Plane 0 to Plane 3, respectively. Here, the memory block 393 (Block 393) included in the super block 98 (SB 98) may be the bad block.

Referring to FIGS. 4 and 13, the bad block manager 220 may search whether the bad block is included in the super block 98. The bad block manager 220 may confirm that the memory block 393 (Block 393) is the bad block.

Accordingly, the bad block manager 220 may select a replacement block to replace the memory block 393 (Block 393), which is the bad block. At this time, all of the reserved memory blocks 112 belonging to the plane 1 (Block N+1, Block N+5, and Block N+9) may already be in use as replacement blocks. Accordingly, the bad block manager 220 may select a replacement block from among the memory blocks included in the free super blocks including user memory blocks 111. The free super block may refer to a super block of an empty status in which data is not stored because the free super block is not yet allocated as a super block.

For example, the bad block manager 220 may select a memory block 397 (Block 397) included in a free super block 99 (SB 99) as a replacement block. When the bad block manager 220 selects the replacement block from among the free super blocks, memory blocks included in a super block having a low priority for super block allocation may be preferentially selected as the replacement blocks. For example, when at least a portion of memory blocks belonging to planes other than the plane 1 included in the free super block 99 (SB 99) is being used as a replacement block, the free super block 99 is less likely to be allocated, so a probability that the memory block 397 (Block 397) included in the free super block 99 (SB 99) is selected as the replacement block may increase. In addition, when an erase count of the free super block 99 (SB 99) is greater than those of other free super blocks, the probability that the memory block 397 (Block 397) included in the free super block 99 is selected as the replacement block may increase.

When the replacement block is selected, the bad block manager 220 may provide the information on the replacement block to the block information storage 230, and thus the block information storage 230 may update the mapping information 233. The mapping information 233 may include information indicating that the memory block 393 (Block 393) included in the existing super block 98 (SB 98) is replaced with the memory block 397 (Block 397). For example, the mapping information 233 may include position information of Block 393 previously included in the existing SB 98 and position information of Block 397 which is the replacement block newly included in SB 98.

In addition, thereafter, the free super block 99 (SB 99) including the replacement block may be maintained so that the priority for the super block allocation is the lowest. That is, the super block manager 210 may preferentially allocate a free super block that does not include the replacement block over a free super block that includes the replacement block.

The storage device according to an embodiment of the present disclosure may utilize the user memory blocks 111 as replacement blocks as needed in addition to the preset reserved memory blocks 112. Therefore, the allowable number of MBBs allowed per plane may be increased, and performance deterioration of the memory device 100 due to the occurrence of the GBB may be improved.

Because the replacement block is selected from among the memory blocks included in the super block having the lowest priority for the super block allocation among the free super blocks, and because the free super block including the replacement block is maintained so that the priority for the super block allocation is low, problem arising from the lack of the user memory blocks 111 may be minimized. In particular, in the memory device 100, the number of super blocks in the free status may be maintained to be equal to or greater than a predetermined number. In this case, even though the memory blocks included in the super block of which the priority for the super block allocation is maintained at the lowest priority are used as the replacement blocks, the problem due to the decrease of the user memory blocks 111 may hardly occur.

FIGS. 14 to 16 are diagrams illustrating examples of information stored in a memory controller according to an embodiment of the present disclosure.

Referring to FIGS. 4 and 14, a block status information 231 stored in a block information storage 230 may include status information corresponding to each super blocks. For example, the block status information 231 may include information indicating whether a super block is allocated. The block status information 231 corresponding to super blocks SB 0, SB 1, SB 2, SB 97, and SB 98 may include information indicating allocated, namely, the super blocks are allocated and opened by the super block manager 210 and storing data. The block status information 231 corresponding to the super blocks SB 3, SB 4, and SB 99 that are not yet allocated and are in an empty status may include information indicating unallocated.

In addition, the block status information 231 may further include information indicating a current data storage situation of the super block. The block status information 231 corresponding to the super blocks SB 0, SB 1, and SB 98, in which data is stored in the entire super block, may include information indicating a full status. The block status information 231 corresponding to the super blocks SB 2 and SB 97, in which data is stored in a portion of the super block, may include information indicating an open status.

The super blocks SB 3, SB 4, and SB 99, in which data is not stored in the super block and are empty, may include information indicating a free status.

In an embodiment of FIG. 14, the allocated super blocks may be super blocks having open status or full status. In addition, the unallocated super blocks may be super blocks with free status. However, the disclosure is not limited to such an embodiment.

When a super block is allocated by the super block manager 210, the block status information 231 corresponding to the allocated super block may be updated to include the information indicating allocated. In addition, as data is stored, the block status information 231 may be updated to include the information indicating an open status or a full status.

When the super block is released by the super block manager 210, the block status information 231 corresponding to the released super block may be updated to include the information indicating unallocated. In addition, when all memory blocks included in the released super block are erased, the block status information 231 may be updated to include the information indicating free status.

Referring to FIGS. 4 and 15, bad block information 232 stored in a block information storage 230 may include information indicating the position of the bad block.

The bad block information 232 may include information indicating a position of an MBB. The information indicating the position of the MBB may be stored in a memory device 100. When power is applied to the storage device, the block information storage 230 may receive the information on the MBB from the memory device 100.

In addition, the bad block information 232 may include information indicating a position of the GBB. When the GBB occurs during an operation of the memory device, the block information storage 230 may receive the information on the progressive bad block GBB from the memory device 100. Accordingly, the bad block information 232 may be updated to further include a position of a newly generated GBB as the GBB is generated.

The bad block information 232 stored in the block information storage 230 may be stored in the memory device 100 as needed. For example, before power is turned off, the bad block information stored in the block information storage 230 may be stored in the memory device 100, and when power is applied again later, the block information storage 230 may receive the previously stored bad block information 232 from the memory device 100. The previously stored bad block information 232 may include the information on the MBB and the information on the GBB generated until power is turned off.

Referring to FIGS. 4 and 16, the block status information 231 and the mapping information 233 stored in the block information storage 230 may be updated according to the allocation/release of the super block by the super block manager 210 and the replacement of the bad block by the bad block manager 220.

The mapping information 233 may include a mapping relationship with respect to the memory blocks grouped into each of the super blocks. That is, the mapping information 233 may include the position information of the memory blocks included in each of the super blocks, and may include the position information of the replacement block when a portion of the memory blocks is replaced with the replacement block. Accordingly, information indicating that the memory block 5 (Block 5), the memory block 9 (Block 9), the memory block 389 (Block 389), and the memory block 393 (Block 393), which are the MBBs of the plane 1, are replaced with the memory block N+1, the memory block N+5, the memory block N+9, and the memory block 397 (Block 397), respectively, may be included in the mapping information 233. Here, all replacement blocks may be memory blocks of the plane 1. In addition, the memory block N+1, the memory block N+5, and the memory block N+9, which are reserved memory blocks RB, may be preferentially used as the replacement blocks. When the super block 98 (SB 98) is allocated in a state in which all reserved memory blocks RB belonging to the plane 1 are already used as replacement blocks, the memory block 397 (Block 397), which is the user memory block 111, may replace the memory block 393 (Block 393), which is the bad block.

The block status information 231 may include status information Status of the super blocks, whether the memory blocks included in the super blocks are used as the replacement blocks Replacement, an erase count Erase Count, and the like. The erase count Erase Count may be an erase count of each of the super blocks and/or an erase count of each of the memory blocks included in the super blocks.

The status information Status of the super blocks may include information indicating whether the super block is allocated and the current data storage situation. In an embodiment, the allocated super blocks may be in an open status or a full status, and the unallocated super blocks may be in a free status.

As described above, the memory blocks included in a portion of the free super blocks may be used as replacement blocks, and the free super block including the replacement block may indicate information indicating that the replacement block is included. Accordingly, in FIG. 16, the super block SB 99 in the free status may include information indicating that the replacement block is included, and other super blocks SB 3 and SB 4 in the free status may include information indicating that the replacement block is not included.

When the super block manager 210 allocates a new super block, a super block to be allocated may be selected from among the free super blocks. The super block manager 210 may select the super block to be allocated based on the block status information 231. The super block manager 210 may preferentially select a free super block that does not include a replacement block. In FIG. 16, the super block 99 (SB 99) is pushed to a lower priority, and the super block manager 210 may select a super block to be allocated from among the super block 3 (SB 3) and the super block 4 (SB 4). Next, the super block manager 210 may select the super block to be allocated by further considering the erase count. For example, the super block manager 210 may preferentially allocate a super block having a smaller erase count, and thus allocate the super block 3 (SB 3). In an embodiment, when erase counts of memory blocks in any one super block are the same, the erase count of the super block may mean the erase count of the memory block included in the super block. In another embodiment, when the erase counts of the memory blocks in any one super block are different from each other, the erase count of the super block may mean a maximum value from among erase count values of the memory blocks included in the super block.

In FIG. 16, when a grow defect occurs in memory block 10 (Block 10) included in a previously allocated super block 2 (SB 2), that is, when the memory block 10 becomes a GBB, the bad block manager 220 may select a replacement block to replace the memory block 10 (Block 10), which is in plane 2. The bad block manager 220 may preferentially consider the reserved memory blocks RB as replacement block candidates. Accordingly, the replacement block may be preferentially selected from among a memory block N+2, a memory block N+6, and a memory block N+10, which are reserved memory blocks RB belonging to the plane 2, like memory block 10 (①).

When all reserved memory blocks RB belonging to the plane 2 are already used as replacement blocks, the bad block manager 220 may select a replacement block from among the memory blocks included in the free super blocks. The bad block manager 220 may select a super block in which a replacement block is positioned from among the free super blocks based on the block status information 231. The bad block manager 220 may select a free super block having a lower priority for super block allocation as the super block in which a replacement block is located. Accordingly, when memory blocks of other planes in the free super block are already used as replacement blocks, and when the corresponding free super block has the lowest priority for allocation, the corresponding free super block may be preferentially considered as the super block in which the replacement block is positioned. For example, the memory block 398 (Block 398) of the plane 2 included in the super block 99 (SB 99) may be selected as the replacement block (②) for bad Block 10.

When the memory block 398 (Block 398) is already used as a replacement block, the bad block manager 220 may select a super block in which a replacement block is located by further considering the erase count. In an embodiment, since the priority for the super block allocation increases as the erase count of the super block decreases, a memory block included in the super block having a larger erase count may be selected as having the replacement block. For example, a memory block 18 (Block 18) of the plane 2 included in the super block 4 (SB 4), which has the largest erase count of 10, may be selected as the super block with the replacement block (③) if Block 398 is not available. In an embodiment, when the erase counts of memory blocks in any one super block are the same, the erase count of the super block may mean the erase count of the memory block included in the super block. In another embodiment, when the erase counts of the memory blocks in any one super block are different from each other, the erase count of the super block may mean a maximum value from among erase count values of the memory blocks included in the super block.

In another embodiment, the bad block manager 220 may select a super block that includes the replacement block by additionally considering the erase count of the memory blocks of the same plane as the bad block. For example, although not illustrated in FIG. 16, when the super block with the replacement block is selected from among two super blocks having the same overall erase count, the bad block manager 220 may select the super block whose memory block in the same plane as the bad block has the smaller erase count.

Figure 17:
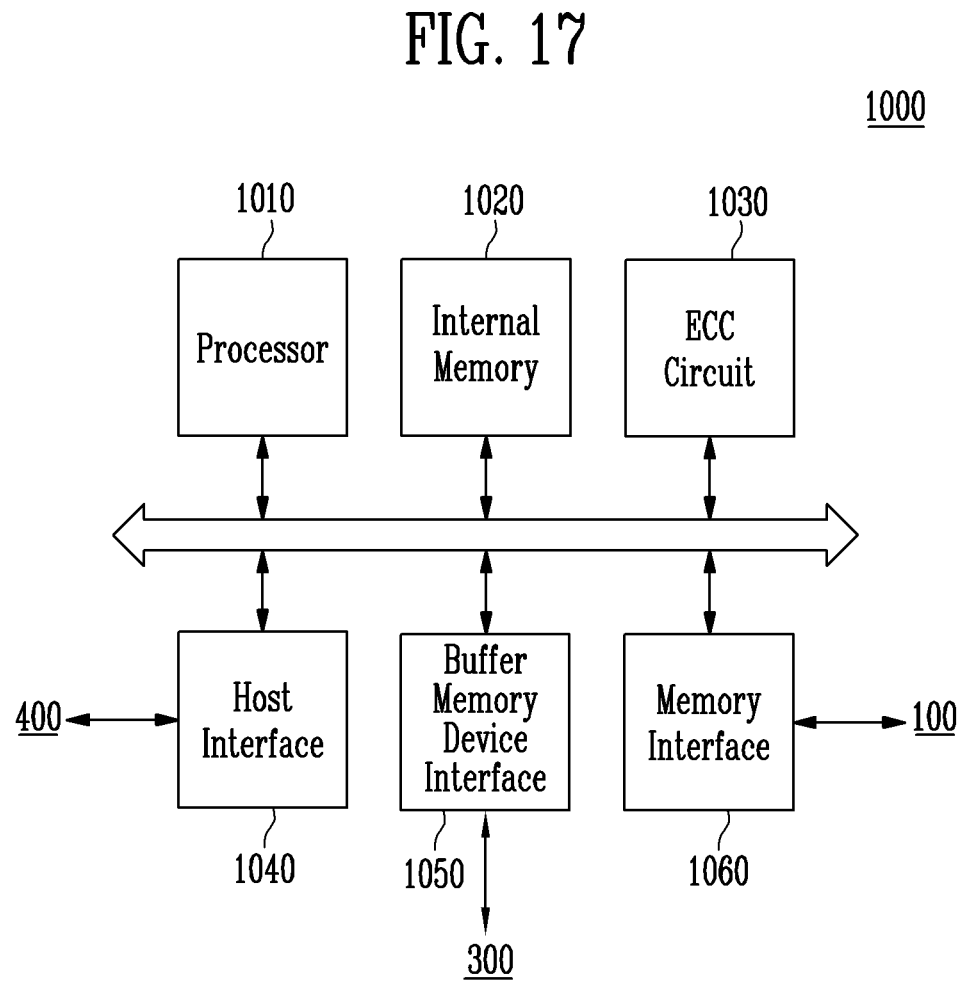

FIG. 17 is a diagram illustrating a memory controller according to another embodiment of the present disclosure.

Referring to FIG. 17, a memory controller 1000 may include a processor 1010, an internal memory 1020, an error correction code circuit 1030, a host interface 1040, a buffer memory device interface 1050, and a memory interface 1060.

The processor 1010 may perform various operations or may generate various commands for controlling a memory device 100. When receiving a request from a host 400, the processor 1010 may generate a command according to the received request and transmit the generated command to a queue controller (not shown). In an embodiment, the processor 1010 may manage the memory blocks of the memory device 100 by grouping the memory blocks. In an embodiment, the processor 1010 may allocate the super block in which data is to be stored or release the super block in which data is stored in response to the request from the host 400. Alternatively, the processor 1010 may allocate or release the super block independently. The processor 1010 may allocate or release the super block based on information on the memory blocks stored in the internal memory 1020 or an external buffer memory device 300. In addition, the processor 1010 may replace the bad blocks among the memory blocks with replacement blocks based on the information on the memory blocks stored in the internal memory 1020 or the external buffer memory device 300.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM). In an embodiment, a portion of the internal memory 1020 may store the information on the memory blocks. The information on the memory blocks may be, for example, block status information, bad block information, mapping information, and the like. The internal memory 1020 may receive the bad block information from the memory device 100. In addition, the block status information, the mapping information, and the like may be stored or updated in the internal memory 1020 by the processor 1010.

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an exemplary embodiment, an error correction block may be provided as a component of the memory controller 1000.

The host interface 1040 may exchange a command, an address, data, and the like between the memory controller 1000 and the host 400. For example, the host interface 1040 may receive a request, an address, data, and the like from the host 400, and may output data read from the memory device 100 to the host 400. The host interface 1040 may communicate with the host 400 using various protocols.

The buffer memory device interface 1050 may transmit data between the processor 1010 and the buffer memory device 300. The buffer memory device 300 may be used as an operation memory or a cache memory of the memory controller 1000 and may store data used in a storage device 50. In an embodiment, the buffer memory device interface 1050 may store the information on the memory blocks in the buffer memory device 300 according to control of the processor 1010. In addition, the buffer memory device interface 1050 may use the buffer memory device as various buffers by the processor 1010. When the buffer memory device is included in the memory controller 1000, the buffer memory device interface 1050 may be omitted.

The memory interface 1060 may exchange the command, the address, the data, and the like between the memory controller 1000 and the memory device 100. For example, the memory interface 1060 may transmit the command, the address, the data, and the like to the memory device 100 and may receive the data and the like from the memory device 100 through a channel. The memory interface 1060 may control the memory device 100 so that memory blocks included in different planes of the memory device 100 may operate in parallel.

Figure 18:
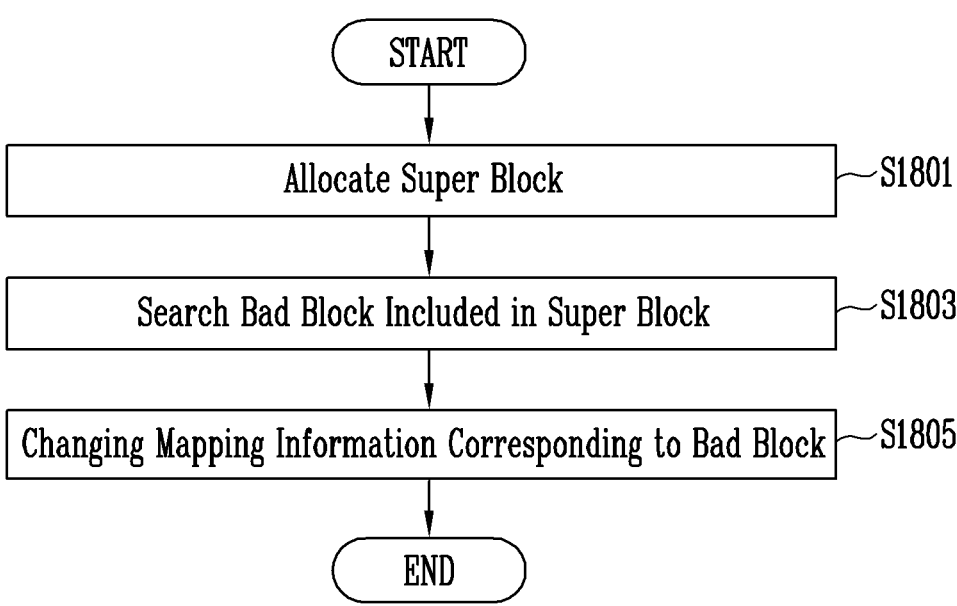
FIG. 18 is a flowchart illustrating a super block allocation process of a memory controller according to an embodiment of the present disclosure.

FIG. 18 is a flowchart illustrating a super block allocation process of a memory controller according to an embodiment of the present disclosure.

Referring to FIGS. 4 and 18, in operation S1801, a super block manager 210 of a memory controller 200 may allocate a super block. The super block may include memory blocks belonging to two or more planes each operating in parallel. The super block manager 210 may allocate the super block according to a set priority based on the block status information 231 on the memory blocks stored in the block information storage 230. The super block manager 210 may preferentially allocate a free super block that does not include a replacement block. In addition, the super block manager 210 may allocate a free super block based on the erase count of the super blocks or the erase counter of each of the memory blocks included in the super blocks. For example, the super block manager 210 may preferentially allocate a free super block having the smallest erase count. Here, the erase count of the super blocks may be expressed as the largest value from among erase count values of the individual memory blocks included in each of the super blocks.

In operation S1803, a bad block manager 220 of the memory controller 200 may search for a bad block included in the super block to be allocated. The bad block manager 220 may search for the bad block included in the super block to be allocated based on the bad block information 232 stored in the block information storage 230.

In operation S1805, mapping information 233 corresponding to the bad block included in the block information storage 230 of the memory controller 200 may be changed. After selecting a replacement block belonging to the same plane as the bad block, the bad block manager 220 may provide the information on the replacement block to the block information storage 230. Accordingly, the mapping information 233 stored in the block information storage 230 may be changed to reflect the bad block replaced with the replacement block. A process of selecting the replacement block is described in more detail in the following description of FIG. 19.

Figure 19:
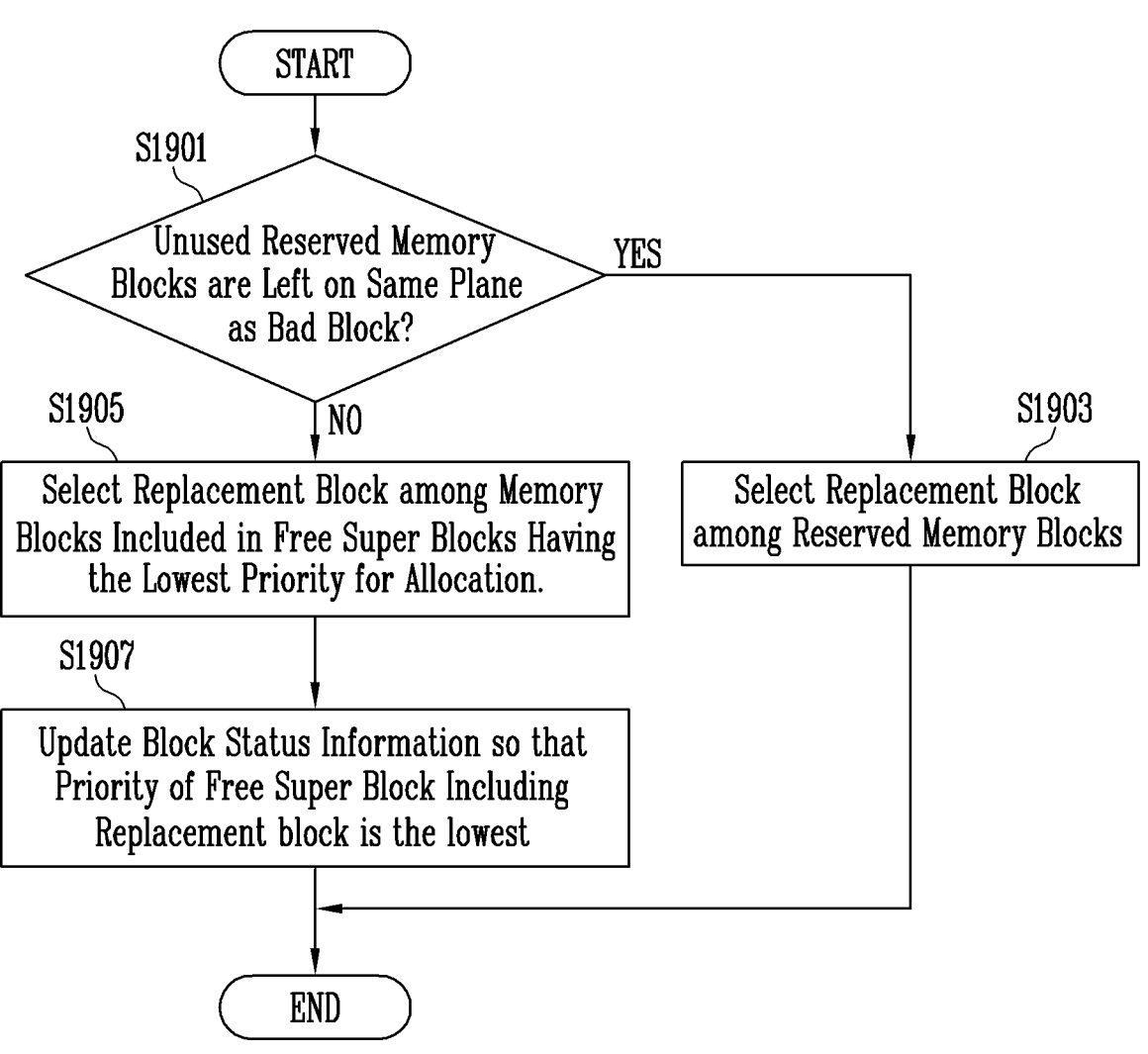
FIG. 19 is a flowchart illustrating a bad block replacement process of a memory controller according to an embodiment of the present disclosure.

FIG. 19 is a flowchart illustrating a bad block replacement process of a memory controller according to an embodiment of the present disclosure. FIG. 19 may be a flowchart illustrating an operation in S1805 of FIG. 18 in more detail.

Referring to FIGS. 4 and 19, in operation S1901, a bad block manager 220 of a memory controller 200 may check whether reserved memory blocks 112 that are not used as replacement blocks are among the reserved memory blocks 112 of the same plane as the bad block.

When unused reserved memory blocks 112 in the same plane as the bad block exist, the bad block manager 220 of the memory controller 200 may select a replacement block from among the unused reserved memory blocks 112 in the same plane in operation S1903.

When unused reserved memory blocks 112 remaining in the same plane as the bad block do not exist, the bad block manager 220 of the memory controller 200 may select a replacement block based on a priority order for allocating super blocks in operation S1905. The bad block manager 220 may select a memory block included in a super block having the lowest priority for allocation as the replacement block. For example, a free super block in which memory blocks in different planes from that of the bad block are already used as the replacement blocks has a low priority for allocation. As a result, the bad block manager 220 may preferentially select a memory block from a free super block, with memory blocks of different planes already in use, as the replacement for the bad block.

In addition, the bad block manager 220 may select a replacement block in consideration of the erase count of the super blocks or the erase counter of the individual memory blocks included in the super blocks. For example, the bad block manager 220 may select a memory block included in a super block having the largest erase count as the replacement block. In an embodiment, when the erase counts of memory blocks in any one super block are the same, the erase count of the super block may mean the erase count of a memory block included in the super block. In another embodiment, when the erase counts of memory blocks in any one super block are different from each other, the erase count of the super block may mean a maximum value from among erase count values of the memory blocks included in the super block.

In another embodiment, the bad block manager 220 may select a super block with the replacement block by additionally considering the erase count of the memory blocks in same plane as the bad block. For example, when a super block with the replacement block is selected from among two super blocks having the same erase count, the bad block manager 220 may select the super block with the memory block having a smaller erase count among the memory blocks of the same plane as the replacement block for the bad block.

When the replacement block is selected, the bad block manager 220 may change the mapping information 233 stored in the block information storage 230 to reflect that the bad block is replaced with the replacement block.

Thereafter, in operation S1907, the block status information 231 stored in the block information storage 230 of the memory controller 200 may be updated. For example, the block status information 231 corresponding to the free super block to which the replacement block belongs may be updated to include information indicating that the replacement block is included. For example, the free super block to which the replacement block belongs may have the lowest priority for super block allocation.

Figure 20:
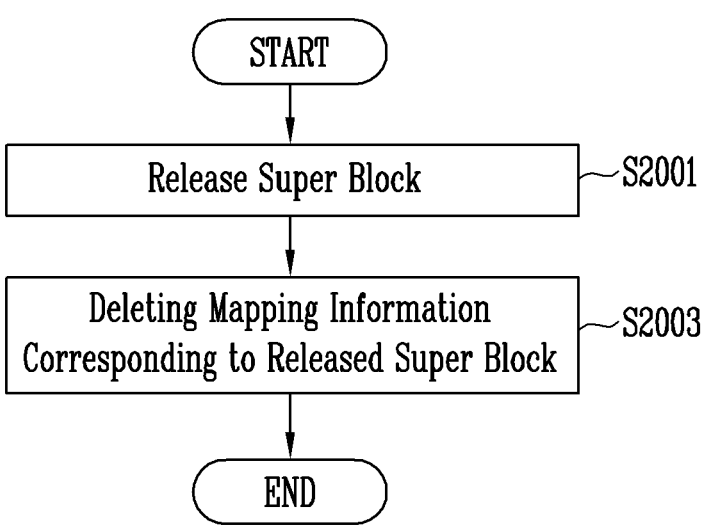
FIG. 20 is a flowchart illustrating a super block release process for a memory controller according to an embodiment of the present disclosure.

FIG. 20 is a flowchart illustrating a super block release process for a memory controller according to an embodiment of the present disclosure.

Referring to FIGS. 4 and 20, in operation S2001, a super block manager 210 of a memory controller 200 may release a super block. All data included in the super block to be released may be invalid data, or the super block to be released may be in an erase status. Alternatively, memory blocks of the super block to be released may no longer operate in parallel.

In operation S2003, the mapping information 233 corresponding to the released super block included in the block information storage 230 of the memory controller 200 may be deleted. The super block manager 210 may provide information on the released super block to the block information storage 230. Accordingly, the mapping information 233 corresponding to the released super block may be deleted, and as a result, mapping information 233 regarding a mapping relationship between a bad block and a replacement block included in the released super block may be deleted. Accordingly, a memory block used as a replacement block for the released super block may be reused as a replacement block for another super block as the super block is released.

What is claimed is:

1. A storage device comprising:

a memory device including a plurality of planes each including a plurality of memory blocks; and a controller configured to group the memory blocks into a plurality of super blocks, each super block including memory blocks belonging to two or more planes operating in parallel, to change mapping information so that a bad block included in a super block to be allocated during super block allocation is replaced with a replacement block of the same plane as the bad block, and to delete the mapping information corresponding to the replacement block when an allocated super block is released, wherein the plurality of memory blocks are divided into user memory blocks grouped into the super blocks and reserved memory blocks that are not grouped into the super blocks, wherein the replacement block is selected from a group consisting of memory blocks included in free super blocks with an empty status and the reserved memory blocks, wherein the replacement block is selected from among memory blocks included in a free super block having a lowest priority for the super block allocation from among the free super blocks, and wherein a priority of the free super block is set lower as a total number of times memory blocks included in the free super block selected as the replacement block increases.

2. The storage device of claim 1, wherein the replacement block is preferentially selected among the reserved memory blocks.

3. The storage device of claim 2, wherein the replacement block is selected from among the memory blocks included in the free super blocks when all of the reserved memory blocks of the same plane as the bad block are in use as replacement blocks.

4. The storage device of claim 3, wherein a free super block including a memory block selected as the replacement block is assigned the lowest priority for the super block allocation.

5. The storage device of claim 4, wherein the assigned priority is based on an erase count of each of the super blocks from the plurality of super blocks or an erase count of each of the memory blocks within the free super block.

6. The storage device of claim 1, wherein the number of the free super blocks is a preset number or higher.

7. The storage device of claim 1, wherein the bad block is a manufacture bad block or a growing bad block.

8. A memory controller comprising:

a block information storage configured to store information on a plurality of memory blocks included in a memory device including a plurality of planes;

a super block manager configured to allocate and release super blocks, each including memory blocks belonging to two or more planes operating in parallel, based on the information on the memory blocks, and to provide information on the super blocks to the block information storage; and a bad block manager configured to search for a bad block included in a super block to be allocated based on the information on the memory blocks and to provide information on a replacement block, of the same plane as the bad block, for replacing the bad block to the block information storage, wherein the block information storage updates mapping information corresponding to a super block including the bad block based on the information on the replacement block and deletes mapping information corresponding to a released super block based on information on the released super block received from the super block manager, wherein the bad block manager selects the replacement block from among memory blocks included in a free super block having a lowest priority for super block allocation, and wherein a priority of the free super block is set lower as a total number of times memory blocks included in the free super block selected as the replacement block increases.

9. The memory controller of claim 8, wherein the plurality of memory blocks are divided into user memory blocks grouped into the super blocks and reserved memory blocks that are not grouped into the super blocks, and wherein the replacement block is selected from a group consisting of memory blocks included in free super blocks of an empty status from among the super blocks and the reserved memory blocks.

10. The memory controller of claim 9, wherein the super block manager allocates the super block according to a priority set based on status information on the memory blocks stored in the block information storage.

11. The memory controller of claim 10, wherein the bad block manager searches for the bad block included in the super block to be allocated based on mapping information of the super blocks stored in the block information storage and bad block information.

12. The memory controller of claim 11, wherein the bad block manager preferentially selects the replacement block from among the reserved memory blocks, and when all reserved memory blocks of the same plane as the bad block are in use as replacement blocks, the replacement block is selected from among memory blocks included in the free super blocks.

13. The memory controller of claim 12, wherein, when the replacement block is selected among the memory blocks included in the free super blocks, the block information storage updates the status information on the memory blocks so that the priority for the super block allocation of a free super block including the replacement block is lowest.

14. The memory controller of claim 13, wherein the status information on the memory blocks includes information on an erase count of each of the super blocks and an erase count of each of the memory blocks.

15. The memory controller of claim 11, wherein the bad block information includes information on a manufacture bad block and information on a growing bad block.

16. A method of operating a memory controller for managing a plurality of memory blocks included in a memory device as a plurality of super blocks by grouping the plurality of memory blocks, the method comprising:

allocating a super block including memory blocks belonging to two or more planes each operating in parallel;

changing mapping information so that a bad block included in the super block is replaced with a replacement block of the same plane as the bad block;

releasing the super block; and deleting mapping information corresponding to the released super block, wherein the plurality of memory blocks are divided into user memory blocks grouped into the super blocks and reserved memory blocks that are not grouped into the super blocks, wherein the replacement block is selected from a group consisting of memory blocks included in free super blocks of an empty status among the super blocks and the reserved memory blocks, wherein the replacement block is selected from among memory blocks included in a free super block having a lowest priority for super block allocation from among the free super blocks, and wherein a priority of the free super block is set lower as a total number of times memory blocks included in the free super block selected as the replacement block increases.

17. The method of claim 16, wherein the replacement block is preferentially selected from among the reserved memory blocks and, when all reserved memory blocks of the same plane as the bad block are in use as replacement blocks, the replacement block is selected from among the memory blocks included in the free super blocks.

18. The method of claim 17, further comprising:

updating, when the replacement block is selected among the memory blocks included in the free super blocks, status information of the memory blocks so that a priority for the super block allocation of a free super block including the replacement block is the lowest.

19. The method of claim 18, wherein allocating the super block comprises allocating the super block according to a priority set based on the status information.

\* \* \* \* \*